(12) United States Patent
Komanduri et al.

(10) Patent No.: US 9,997,070 B1
(45) Date of Patent: Jun. 12, 2018

(54) USE OF SOFTWARE CONFIGURABLE LUMINAIRE IN PARKING APPLICATION

(71) Applicant: ABL IP HOLDING LLC, Conyers, GA (US)

(72) Inventors: Ravi Kumar Komanduri, Brambleton, VA (US); David P. Ramer, Reston, VA (US)

(73) Assignee: ABL IP HOLDING LLC, Conyers, GA (US)

(*) Notice: Subject to any disclaimer, the term of this patent is extended or adjusted under 35 U.S.C. 154(b) by 0 days. days.

(21) Appl. No.: 15/598,892

(22) Filed: May 18, 2017

(51) Int. Cl.
| | | |
|---|---|---|
| *G08G 1/14* | (2006.01) | |
| *H05B 37/02* | (2006.01) | |
| *G08B 5/38* | (2006.01) | |
| *G08C 23/02* | (2006.01) | |
| *H04B 10/116* | (2013.01) | |
| *G08G 1/0969* | (2006.01) | |

(52) U.S. Cl.
CPC ............... *G08G 1/142* (2013.01); *G08B 5/38* (2013.01); *G08C 23/02* (2013.01); *G08G 1/0969* (2013.01); *G08G 1/144* (2013.01); *H04B 10/116* (2013.01); *H05B 37/0227* (2013.01); *H05B 37/0272* (2013.01)

(58) Field of Classification Search
CPC ...... G08G 1/142; G08G 1/144; G08G 1/0969; H04B 10/116; G08B 5/38; H05B 37/0272; H05B 37/0227; G08C 23/02
See application file for complete search history.

(56) References Cited

U.S. PATENT DOCUMENTS

| | | | |
|---|---|---|---|
| 6,791,473 B2 | 9/2004 | Kibria et al. | |
| 6,816,085 B1 | 11/2004 | Haynes et al. | |
| 6,987,787 B1* | 1/2006 | Mick ................. | H05B 33/0818 372/29.02 |
| 7,333,903 B2 | 2/2008 | Walters et al. | |
| 8,732,031 B2 | 5/2014 | Martin et al. | |
| 9,622,326 B1* | 4/2017 | Devyver ............ | H05B 37/0227 |
| 2007/0045524 A1* | 3/2007 | Rains, Jr. ................. | F21S 2/00 250/228 |
| 2014/0310075 A1 | 10/2014 | Ricci | |
| 2014/0354160 A1* | 12/2014 | Aggarwal .......... | H05B 37/0227 315/152 |
| 2015/0301781 A1 | 10/2015 | Ekkaia et al. | |
| 2015/0338268 A1* | 11/2015 | Ramer ..................... | G01J 1/08 250/208.1 |

* cited by examiner

*Primary Examiner* — Nader Bolourchi
(74) *Attorney, Agent, or Firm* — RatnerPrestia

(57) ABSTRACT

A plurality of networked lighting devices are deployed in a parking garage. The lighting devices each have a display, a controllable general illumination light source, and an occupancy sensor. When a user enters the parking garage in a vehicle, the display of lighting devices outputs directional arrows and communicates with other lighting devices to direct the user to a vacant parking space (e.g., displays green). In response to detecting that the vehicle has parked in a parking space, the display output is adjusted (e.g., displays red) and the general illumination light source is changed to a different lighting state. Hence, when the user pulls into the parking space, illumination lighting is activated to a brighter setting. The illumination lighting is adjusted to the brighter setting as the user approaches other lighting devices, for example, when approaching an elevator or later re-approaches the vehicle to provide a feeling of safety.

20 Claims, 12 Drawing Sheets

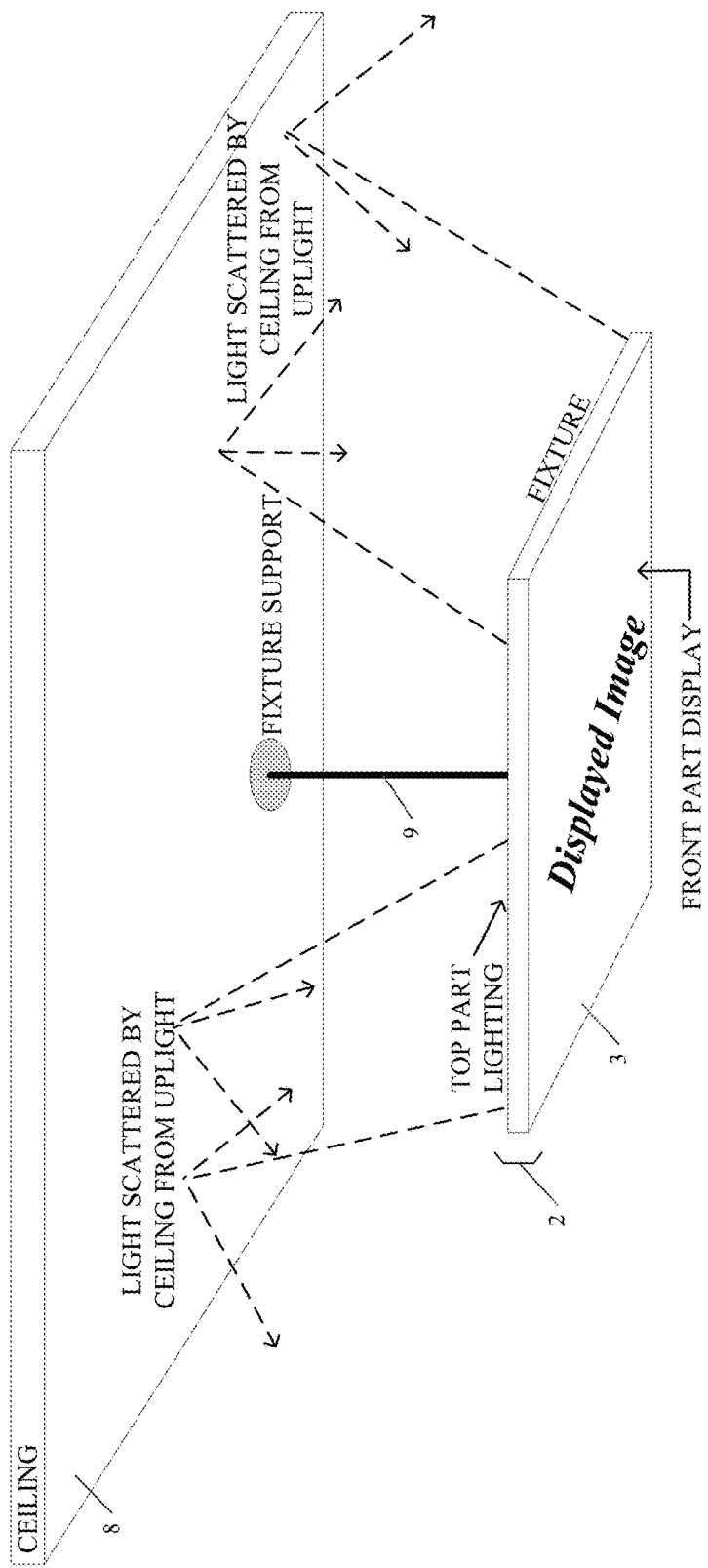

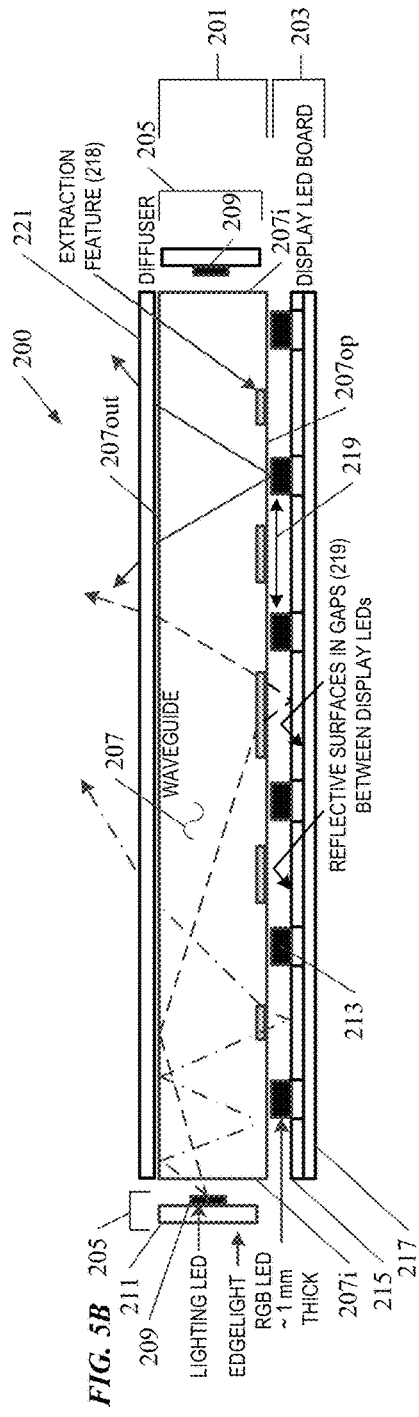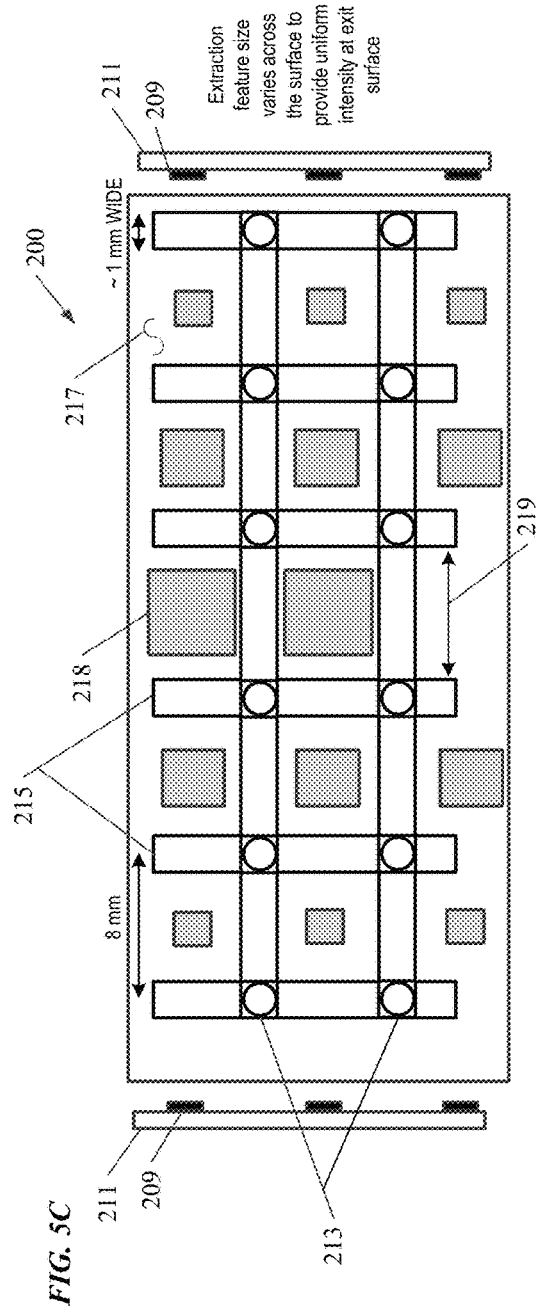

USE OF SOFTWARE CONFIGURABLE LUMINAIRE IN PARKING APPLICATION

TECHNICAL FIELD

The present subject matter relates to examples of utilizing a luminaire, that incorporates both illumination light sources and a display, for a parking application. The present subject matter also encompasses a lighting device and lighting system that includes such a luminaire.

BACKGROUND

Systems currently on the market provide parking status indicators on displays to convey how many spaces in a parking garage are currently available. Such systems use occupancy sensors to determine whether a space is vacant or empty. Moreover, illumination lighting sources currently available on the market can be controlled by occupancy sensors to dim the illumination lighting sources for energy efficiency purposes. But the current solutions do not integrate the display and illumination lighting source together, which is sub-optimal.

While displaying the number of spaces available is useful to the user to understand the current vacancy status of the parking garage, the displays and illumination lighting provide no guidance to the user for what is the best action or most likely next action to take to find an empty parking space. Nor do the display or illumination lighting sources guide the user to help the user find their vehicle when the user desires to leave the parking garage. Thus, an inexperienced user may experience frustration or difficulty understanding what to do if they wish to find a parking space for their vehicle or in attempting to locate their parking space when they cannot remember where they parked. Improvements in display lighting and illumination lighting and controls of a lighting system are needed to overcome these or other limitations in the art.

Moreover, lighting equipment for illumination and displays for image output have fundamentally different requirements, for example, for consumer applications.

Electrically powered artificial illumination lighting has become ubiquitous in modern society. Electrical lighting equipment is commonly deployed, for example, in homes, buildings of commercial and other enterprise establishments, as well as in various outdoor settings.

In conventional luminaires, the luminance output can be turned ON/OFF and often can be adjusted up or dimmed down. In some devices, e.g., using multiple colors of light emitting diode (LED) type sources, the user may be able to adjust a combined color output of the resulting illumination. The changes in intensity or color characteristic of the illumination may be responsive to manual user inputs or responsive to various sensed conditions in or about the illuminated space.

There also have been proposals to use displays or display-like devices mounted in or on the ceiling to provide variable lighting. The Fraunhofer Institute, for example, has demonstrated lighting equipment using luminous tiles, each having a matrix of red (R) LEDs, green (G), blue (B) LEDs and white (W) LEDs as well as a diffuser film to process light from the various LEDs. The LEDs of the system were driven to simulate or mimic the effects of clouds moving across the sky. Although use of displays allows for variations in appearance that some may find pleasing, the displays or display-like devices typically have been optimized for image output and do not provide particularly good illumination for general lighting applications. A display typically has a Lambertian output distribution over substantially the entire surface area of the display screen, which does not provide the white light intensity and coverage area at a floor or ceiling height offered by a similarly sized ceiling-mounted light fixture.

Liquid crystal displays (LCD) also are rather inefficient. For example, backlights in LCD televisions have to produce almost ten times the amount of light that is actually delivered at the viewing surface. Therefore, any LCD displays that might be used as lighting products need to be more efficient than typical LCD displays for the lighting device implementation to be commercially viable.

Projection displays are typically cost effective alternatives to direct-view displays such as LCDs, when large area and high brightness are desired. But the color quality and light distribution from prior projection displays are not sufficient for general lighting applications.

Examples of other uses of lighting in combination with display technologies include various configurations of signage that include light sources as backlighting that are positioned behind a design feature such a diffuser or screen with an image or wording. Examples of such backlit signage includes advertising signs, door exit signs and other examples of signage that would benefit from backlighting. Some of the signs may be controllable to change wording or an image presented on the display device of the sign. In some instances of advertising signage, a transparent display can be used to provide advertising without obstructing a view of either the interior of a store when viewed from the exterior or vice versa, as well as providing an easily changeable design. However, backlit signage without additional lighting is not typically configured to provide general illumination that complies with governmental regulations and industry standards applicable to the environment in which the signage is installed.

SUMMARY

Hence, there is room for further improvement in luminaires that offer both general illumination capabilities and controllable image display capabilities and systems that incorporate such luminaires for a vehicle parking application. Examples of a lighting and display type luminaire use relatively transparent display devices. In such a luminaire, one or more light transmissive areas of the display device is coupled to an output of a light source of a general illumination device.

In an example, a lighting system comprises a plurality of lighting devices. Each lighting device includes an occupancy sensor, a wireless communication interface system, and a luminaire having a display and a general illumination light source. The display comprises a first light emission matrix configured to output light from selected areas of the first emission matrix as a representation of an image. The controllable general illumination light source comprises a second light emission matrix configured to output illumination light from the second light emission matrix. The general illumination light source is co-located with the display such that an available output region of the second light emission matrix at least substantially overlaps an available output region of the first light emission matrix.

A driver system is coupled to control light outputs generated by the first and second light emission matrices. The lighting device further includes a memory storing programming and a processor coupled to the occupancy sensor, the wireless communication interface system, the driver system, and the memory. The processor is configured to operate the general illumination light source and the display via the driver system.

The processor of the lighting device implements functions in the stored programming, including functions to detect via the occupancy sensor that a respective parking space is vacant. In response to detecting via the occupancy sensor that the respective parking space is vacant, the luminaire displays a first visual indicator on the display to produce visible output via the display to provide a first visible cue indicating that the respective parking space is vacant to a user of a mobile device that is being carried by a vehicle (e.g., by displaying green on the display). The processor detects via the occupancy sensor that the vehicle has parked in the respective parking space.

In response to detecting that the vehicle has parked in the respective parking space, the processor operates the controllable general illumination light source to adjust a lighting state of the output illumination light. Alternatively or additionally, the controllable general illumination light source is adjusted based on other inputs, such as a building owner deciding all illumination lighting should be on in the parking garage or a pedestrian walking by the respective parking space. The lighting state adjustment produces visible output via the controllable general illumination light source and includes a change of intensity, color, or color temperature (e.g., increases light intensity of the controllable general illumination light source to provide a feeling of safety).

The processor is further configured to display a second visual indicator on the display to produce visible output via the display to provide a second visible cue indicating that the respective parking space is occupied (e.g., by displaying red on the display). The processor is then configured to log a time of entry of the vehicle into the respective parking space in the memory.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present teachings, by way of example only, not by way of limitation. In the figures, like reference numerals refer to the same or similar elements.

FIG. 5A is an isometric view of the luminaire of FIG. 4 combining a display device and components forming an illumination light source.

FIG. 5B is a side or cross-sectional view, and FIG. 5C is a top plan view, of a section of an edge lit type transmissive lighting device and an associated LED type emissive display.

DETAILED DESCRIPTION

Figure 1:
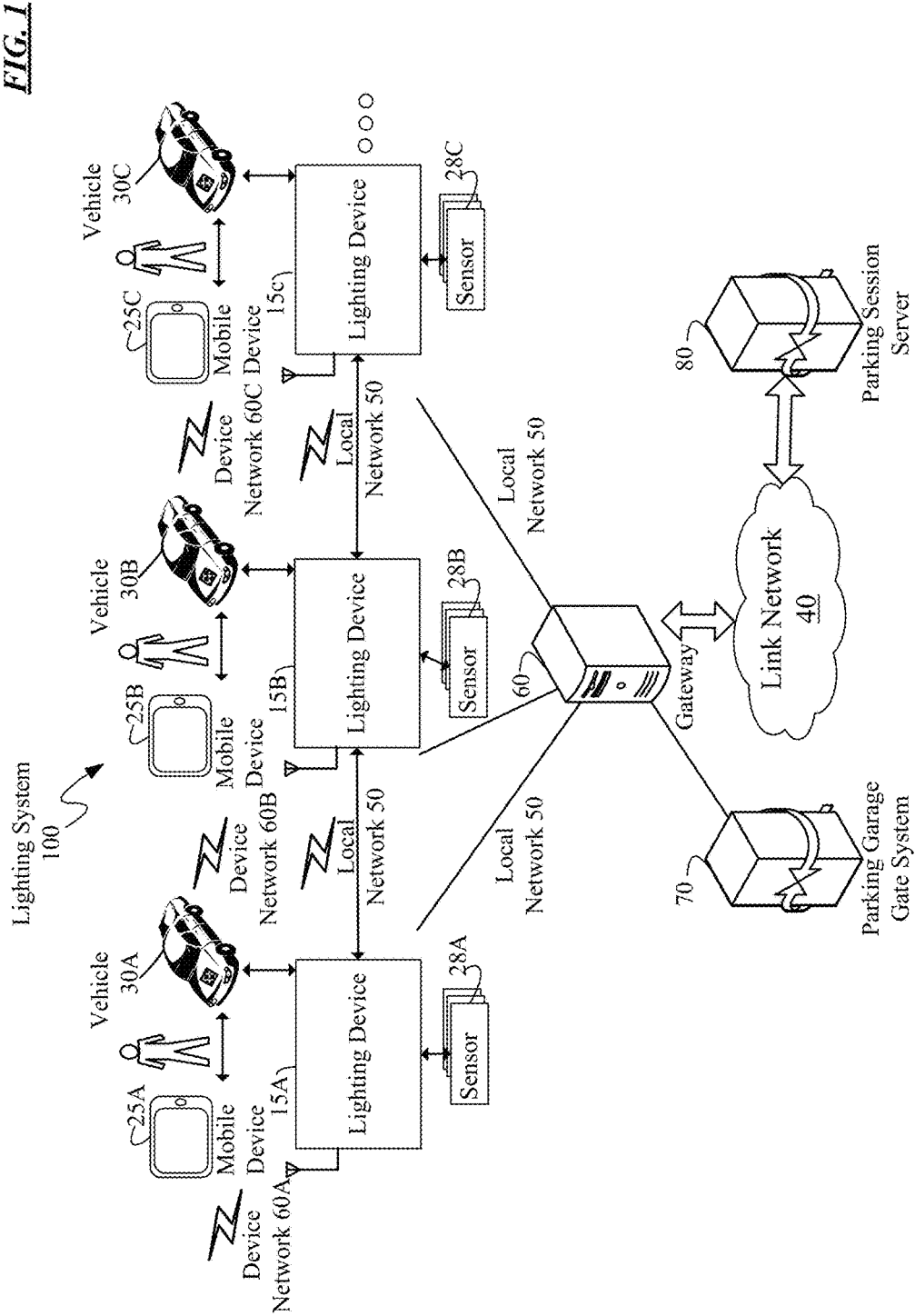
FIG. 1 is a high-level functional block diagram of an example of a lighting system of networks and devices designed to integrate display and illumination lighting sources together in a vehicle parking application.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

A vehicle parking application for a software configurable luminaire offering both illumination and display functionality is disclosed. By, for example, integrating a low resolution display, parking space occupancy sensor, indoor positioning components (e.g., geometri platform), and other onboard intelligence within a lighting fixture, a unified parking system can be developed to address the needs mentioned above.

The term "luminaire," as used herein, is intended to encompass essentially any type of device that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaries in or on a particular premises have other lighting purposes, such as signage for an entrance or to indicate an exit. In most examples, the luminaire(s) illuminate a space or area of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces.

Terms such as "artificial lighting," as used herein, are intended to encompass essentially any type of lighting in which a luminaire produces light by processing of electrical power to generate the light. A luminaire for artificial lighting, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

In the examples below, the luminaire includes at least one or more components forming a lighting source for generating the artificial illumination light for a general lighting application as well as a co-located display device, e.g. integrated/combined with the lighting component(s) of the lighting source into the one structure of the luminaire. In several illustrated examples, such a combinatorial luminaire may take the form of a light fixture, such as a pendant or drop light or a downlight, or wall wash light or the like. Other fixture mounting arrangements are possible. For example, at least some implementations of the luminaire may be surface mounted on or recess mounted in a wall, ceiling or floor. Orientation of the luminaires and components thereof are shown in the drawings and described below by way of non-limiting examples only. The luminaire with the lighting component(s) and the display device may take other forms, such as lamps (e.g. table or floor lamps or street lamps) or the like. Additional devices, such as fixed or controllable optical elements, may be included in the luminaire, e.g. to selectively distribute light output from the display device and/or the illumination light source. Luminaires in the examples shown in the drawings and described below have display and illumination components oriented to output image light in approximately the same direction as some or all of the illumination light.

Hence, at an output of the luminaire, available output regions of the light emission matrices of the general illumination light source and the display at least substantially overlap. For example, the image light and illumination light may be emitted from a common output area or surface of the luminaire, although the two types of light may have somewhat different angular light distributions and/or emerge via different portions of the output area or surface of the luminaire. In an example luminaire with a common output area or surface, if the overlap of the available output regions is complete, both matrices extend across and include sufficient controllable emitters to selectively emit display light and illumination light across the entire luminaire output. In such an example luminaire, the emission matrices also can selectively emit display light and illumination light through any selected smaller portion or area within the luminaire output. Other arrangements of the emission matrices supporting concurrent image output and controllable general illumination, with less complete overlap of the available output regions may still serve as the luminaires in lighting devices that implement the vehicle parking control strategies under consideration herein. A luminaire of a type supporting display and general illumination functions may operate in various modes, e.g. with the display ON while the illumination is OFF or with the display OFF while the illumination is ON. The parking application strategies under consideration here, however, are most useful when a luminaire is emitting at least some display light and at least some general illumination light concurrently.

Terms such as "display" (noun) and "display device" as used herein are intended to encompass essentially any type of hardware device that selectively processes energy to controllably output light representing an image. Display devices may or may not include light generating elements. A pixel is a unit area of an image. On a display device, for example, a pixel is point or small unit of area of light as part of an image presented in the image display output. A display may be selectively controlled to emit light of a different color and intensity at each pixel point/area of the image display output. The image output light may be generated directly by the display pixel emitters (e.g. by direct emissions from LEDs, OLEDs or plasmas at the pixel points of the display), by controlled filtering of source light (e.g. by red, green, blue LCD filters at the pixel points), or by reflection of source light (e.g. by electrophoretic ink pixel points). In other examples of the image display device, a projector of any suitable type may project the display image onto a transmissive or reflective screen. In this later case, the combination of the projector and screen form the display. In a further alternative example, the projector (alone) may be the display device located/configured to output light to project the image onto a structural surface (e.g. wall or ceiling) not itself a component of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source and the display, any associated control processor or alternative higher level control circuitry, and/or data communication interface(s). As noted, the lighting component(s) and display are co-located into an integral unit, such as a light fixture or lamp implementation of the luminaire. The electronics for driving and/or controlling the lighting component(s) and the display may be incorporated within the luminaire or located separately and coupled by appropriate means to the light source component(s) and the display device.

The term "lighting system," as used herein, is intended to encompass essentially any type of system that either includes a number of such lighting devices coupled together for data communication or a lighting device coupled together for data communication with one or more control devices, such as wall switches, control panels, remote controls, central lighting or building control systems, servers, etc.

In several of the examples, the lighting device is software configurable, by programming instructions and/or setting data, e.g. that may be communicated to a processor of the lighting device via a data communication network of a lighting system. Configurable aspects of lighting device operation may include one or more of: a selected image (still or video) for presentation as the image output from the display, and one or more parameters (such as intensity and various color related characteristics) of the illumination light output. If the luminaire also includes an optical device or system for variably controlling or modulating the light output distribution(s), as in several examples, one or more parameters of the output distribution (e.g. beam shape and beam angle of the image light and/or the illumination light) also would be configurable by setting data or instructions communicated to and/or stored in the lighting. An example of a software configurable lighting device, with the luminaire thereof installed for example as a panel or pendant type light fixture, may offer the capability to emulate performance of a variety of different lighting devices for general lighting applications, while presenting any desired appearance via the image display output.

The term "coupled" as used herein refers to any logical, physical or electrical connection, link or the like by which signals produced by one element are imparted to another "coupled" element. Unless described otherwise, coupled components, elements or devices are not necessarily directly connected to one another and may be separated by intermediate components, elements, devices or communication media that may modify, manipulate or carry the signals.

Light output from the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light out or an aspect (e.g. modulation of backlighting and/or adding a detectable code to portion of a displayed image) of the light output from the display device.

Reference now is made in detail to the examples illustrated in the accompanying drawings and discussed below. FIG. 1 illustrates a high-level functional block diagram of an example of a lighting system 100 of networks and devices designed to integrate display and illumination lighting sources together in a vehicle parking application.

As shown, the lighting system 100 includes a plurality of lighting devices 15A-C, mobile devices 25A-C, sensors 28A-C, vehicles 30A-C, a gateway 60, a parking garage gate system 70, and a parking session server 80 in communication via a plurality of networks 40, 50, 60A-C. Each of the lighting devices 15A-C include a luminaire that has a general illumination light source to provide general illumination lighting and the luminaire further includes a display to display an image.

In some of the more specific examples of luminaires like 15A-C, the display and the general illumination light source include respective light emission matrices co-located in the luminaire. The general illumination light source and the display are configured such that, at an output of the luminaire, available output regions of the light emission matrices at least substantially overlap. In specific examples, the overlap extends across the entire output of the lighting devices 15A-C, so that each matrix of emitters can output respective display or general illumination light via all of the luminaire output or via any one or more smaller areas or portions of the luminaire output.

Examples of the luminaire of lighting devices 15A-C that includes both general illumination light sources and transparent displays which use light emission matrices to emit output light of images suitable for application in the software configurable lighting devices are disclosed in U.S. patent application Ser. No. 15/296,634, filed Oct. 18, 2016, entitled "Luminaire Utilizing Display Device and Associated Illumination Component(s);" U.S. patent application Ser. No. 15/244,402, filed Aug. 23, 2016, entitled "Enhancements for Use of a Display in a Software Configurable Lighting Device;" U.S. patent application Ser. No. 15/424,208, filed Feb. 3, 2017, entitled "Luminaire and Lighting System, Combining Transparent Lighting Device and Display Coupled to Output Image via the Transparent Lighting Device;" U.S. patent application Ser. No. 15/198,712, filed Jun. 30, 2016, entitled "Enhancements of a Transparent Display to Form a Software Configurable Luminaire;" U.S. patent application Ser. No. 15/211,272, filed Jul. 15, 2016, entitled "Multi-Processor System and Operations to Drive Display and Lighting Functions of a Software Configurable Luminaire;" U.S. patent application Ser. No. 15/467,333 filed Mar. 23, 2017, entitled "Simultaneous Display and Lighting;" U.S. patent application Ser. No. 15/468,626, filed Mar. 24, 2017 entitled "Simultaneous Wide Lighting Distribution and Display;" U.S. patent application Ser. No. 15/357,143, filed Nov. 21, 2016, entitled "Interlaced Data Architecture for a Software Configurable Luminaire;" and U.S. patent application Ser. No. 15/095,192, filed Apr. 11, 2016, entitled "Luminaire Utilizing a Transparent Organic Light Emitting Device Display," the entire contents all of which are incorporated herein by reference. These incorporated applications also disclose a variety of implementations of a general illumination light source including a second light emission matrix co-located the with an emission matrix of a transparent display.

The lighting devices 15A-C are each in communication with sensors 28A-C. The sensors 28A-C can be ambient light sensors, daylight sensors, motion sensors, proximity sensors, occupancy and vacancy sensors, audio, temperature, infrared sensors, ultrasonic sensors, or other environmental sensor and the like.

In an example, each of the lighting devices 15A-C includes an integrated occupancy sensor, a wireless communication interface system, and a luminaire that includes a display comprising a first light emission matrix configured to output light from selected areas of the first emission matrix as a representation of an image. The luminaire of the lighting devices 15A-C further includes a controllable general illumination light source comprising a second light emission matrix configured to output illumination light from the second light emission matrix. The general illumination light source is co-located with the display such that an available output region of the second light emission matrix at least substantially overlaps an available output region of the first light emission matrix. The lighting devices 15A-C further include a driver system coupled to control light outputs generated by the first and second light emission matrices.

The wireless communication interface system of the plurality of lighting devices 15A-C can includes a wireless radio frequency (RF) communication interface for WiFi, Bluetooth, ZigBee, wireless mesh, or cellular data for communication between the plurality of lighting devices 15A-C, a networked parking garage gate system 70, or a parking session server 80. The wireless communication interface system of the plurality of lighting devices 15A-C can further include a second optical wireless communication interface for visible light communication (VLC) for data communication with the plurality of lighting devices 15A-C or the mobile device 25A-C.

Each of the lighting devices 15A-C further includes a memory storing programming and a processor coupled to the occupancy sensor, the wireless communication interface system, the driver system, and the memory. The processor is configured to operate the general illumination light source and the display via the driver system and implement functions in the stored programming. The specific programming of the lighting devices 15A-C is outlined in further detail below.

As shown, lighting control devices 15A-C are connected to each other and the gateway 60 via a local network 50. The local network 50 can include a wireless access point (e.g., Wi-Fi access point/router not shown) and network gateway 60. In an example, the local network 50 can be a fiber optic network. The network gateway 60 is a data device that provides access between a wide area network (WAN), such as link network 40, and the local network 50 at the parking garage premises (for use by devices communicating through the local on-premises network). The wireless access point (not shown) and network gateway 60 provide routing, access, and other services for the lighting control devices 15A-C and parking garage gate system 70 residing at the premises, for example.

The mobile devices 25A-C can be a smartphone, tablet computer, wearables (e.g., hearing aid, Google Glass, smart watch, or implantables), or laptop/personal computer. In the example, network gateway 60 communicates with the lighting devices 15A-C and the parking garage gate system 70 to aggregate statuses of parking sessions across device networks 60A-C. The gateway 60 is a conduit that transmits the statuses of all parking sessions of the lighting devices 15A-C across the link network 40 to the parking session server 80. The gateway 60 is also in communication with the parking garage gate system 70 to control an electrically-controlled gate arm upon parking session completion in response to commands or messages received from lighting devices 15A-C, mobile devices 25A-C, or parking session server 80.

The parking garage gate system 70 which resides at the premises of the parking garage is in communication with the gateway 60 via the local network 50. An off-premises parking session server 80 communicates with the gateway 60 via the link network 40 to manage parking sessions of vehicles 30A-C residing in the parking garage. As shown, a variety of devices can communicate with each of the lighting devices 15A-C via respective device networks 60A-C, including respective mobile devices 25A-C, vehicles (e.g., cars) 30A-C equipped with a wireless communication interface, and sensors 28-C. Although the sensors 28A-C are shown as in communication with lighting devices 15A-NC via respective device networks 60A-C, it should be understood that sensors 28A-C can be integrated directly in lighting devices 15A-C, in which case communication with sensors 28A-C is not performed over device networks 60A-C.

In the example, the device networks 60A-C can be a wireless mesh network (e.g., ZigBee, DECT, NFC), a personal area network (e.g., Bluetooth or Z-Wave), or a visual light communication (VLC) network. A VLC network is a data communications variant which uses visible light between 400 and 800 THz (780-375 nm), and is a subset of optical wireless communications technologies.

The illustrated local network 50 is a local area network (LAN, e.g., Intranet) that is wireless (e.g., WiFi) or wired (e.g., Ethernet). Device networks 60A-C, such as VLC, have the shortest range followed by ZigBee, DECT, NFC or Bluetooth and VLC. Hence, a local network 50, such as WiFi or Ethernet is advantageously used to connect to the network gateway 60 in an environment where RF signals and modulated light are obstructed as is the case with a concrete parking garage. Using the local network 50 to communicate between lighting devices 15A-C increases the reach to all lighting devices 15A-C, mobile devices 25A-C, vehicles 30A-C, and sensors 28A-C within the parking garage. It is also contemplated that MoCA® or Ethernet technology can be used instead of an entirely wireless local network 50 or link network 40. The link network 40 is a wide area network (WAN, e.g., Internet), such as a cellular network, optical fiber, cable network, or satellite network that can be connected to via Ethernet, for example. However, depending on the implementation of lighting system 100, the link network 40, local network 50, or device networks 60A-C may be varied to comprise a local area network, (LAN, e.g., Intranet), a wide area network (WAN, e.g., Internet), wireless mesh network (e.g., ZigBee), a personal area network (e.g., Bluetooth or Z-Wave), or VLC.

It should also be understood that the communication protocols over networks 50 or 60A-C may be varied, and thus may be via nLight® (commercially available from Acuity Brands Lighting), digital multiplex (DMX) control, Fresco® control network (FCN) (commercially available from Acuity Brands Lighting). FCN, DMX control, nLight®, and Z-Wave are lighting-centric networks that control a variety of luminaires, and therefore can be utilized for local network 50 and device networks 60A-C, in the example. The link network 40, local network 50, and device networks 60A-N are separate networks but with a shared application protocol for parking application controls. It should be appreciated, however, that link network 40, local network 50, and device networks 60A-C may be a different part of the same network tree or star network, and therefore may not be separate networks and can utilize the same network communication protocols.

A variety of lighting controls for a parking application are transmitted over networks 40, 50, and 60A-C, including, illumination adjustments to display a visual indicator on the display of a respective lighting control device 15A-C to produce visible output via the display to provide a visible cue indicating that a respective parking space is vacant or occupied to a user of a mobile device 25A-C that is being carried by a vehicle 30A-C. In addition, controls to turn a controllable general illumination light source of the luminaire of the lighting devices 15A-C on/off, adjust dimming level (dim up/down), set scene (e.g., a predetermined light setting), and sensor trip events of a respective sensor 28A-C are also transmitted over networks 50, 60A-C.

Each of lighting devices 15A-C, mobile devices 25A-C, sensors 28A-C, vehicles 30A-C, gateway 60, parking garage gate system 70, and parking session server 80 can be equipped with wireless transceiver(s), such as a near range Bluetooth Low Energy (BLE) radio, a light modulator for visual light communication (VLC), and/or a wired network communication interface, such as Ethernet. To allow for wireless communication over all three types of networks 40, 50, and 60A-C, each of the lighting devices 15A-C, mobile devices 25A-C, sensors 28A-C, vehicles 30A-C, gateway 60, parking garage gate system 70, and parking session server 80 may include separate radios that operate at three different frequencies, such as sub-GHz (e.g., 900 MHz), Bluetooth Low Energy (BLE 2.4 GHz), and 5 GHz, for example.

As will be explained in further detail below, the luminaire of lighting devices 15A-C includes a display and a controllable general illumination light source can be dimmable, such as a dimmable light fixture. The luminaire can comprise light emitting diodes (LEDs) that emit red, green, and blue (RGB) light or tunable white light. Lighting devices 15A-C are coupled to the illustrated devices of lighting system 100 to receive lighting control events for a parking application and related messages. Daylight, occupancy, and audio sensors or switches can be embedded in lighting devices 15A-C to enable adjustments to a lighting state of the luminaire of lighting devices 15A-C, such as dimming based on occupancy, and to display images on the display of the lighting devices 15A-C, for example.

In an example, each of the lighting devices 15A-C have a display element, controllable general illumination light source, and respective occupancy sensors 28A-C embedded. Utilizing the lighting system 100, when the user enters the parking garage in a respective vehicle 30A-C, the user can enter and exit the parking garage without taking their mobile devices 25A-C out of their pocket. The segmentable display of lighting devices 15A-C provide arrows and communicate with other lighting devices 15A-C to direct the user to a vacant parking space (e.g., by displaying green). In an example, when the user drives by the vacant parking space, the display outputs the color green, a green circle or text stating the parking space is "Available," etc. The segmentable display of lighting devices 15A-C outputs the color red, a red X, or text stating the parking space is "Occupied," etc. in the case of an occupied parking space. The occupancy sensor 28A initiates logging of the time the user enters a parking space. Alternatively, perturbation of RF signals sent/received by a wireless (e.g., WiFi or Bluetooth) communication interface are examined to detect occupancy. Hence, the lighting devices 15A-C can activate parking sessions based on occupancy. Hence, the user need not pull his/her phone out of their pocket. After the user parks in the space, the display may output text stating the parking space is "Occupied" or a red colored X.

The lighting devices 15A-C log how much time is left in a parking session and facilitate parking enforcement, for example, by flashing the display or controllable general illumination light source to guide an officer writing parking tickets. Alternatively, a camera of the lighting devices 15A-C may take a photograph of a license plate of vehicles 30A-C for parking enforcement purposes. Bluetooth, WiFi, or cellular communication can be used to have a lighting device 15A-C that is across the aisle way to take the license plate photograph at a b better angle because the lighting devices 15A-C are linked via the local network 50.

Figure 2:
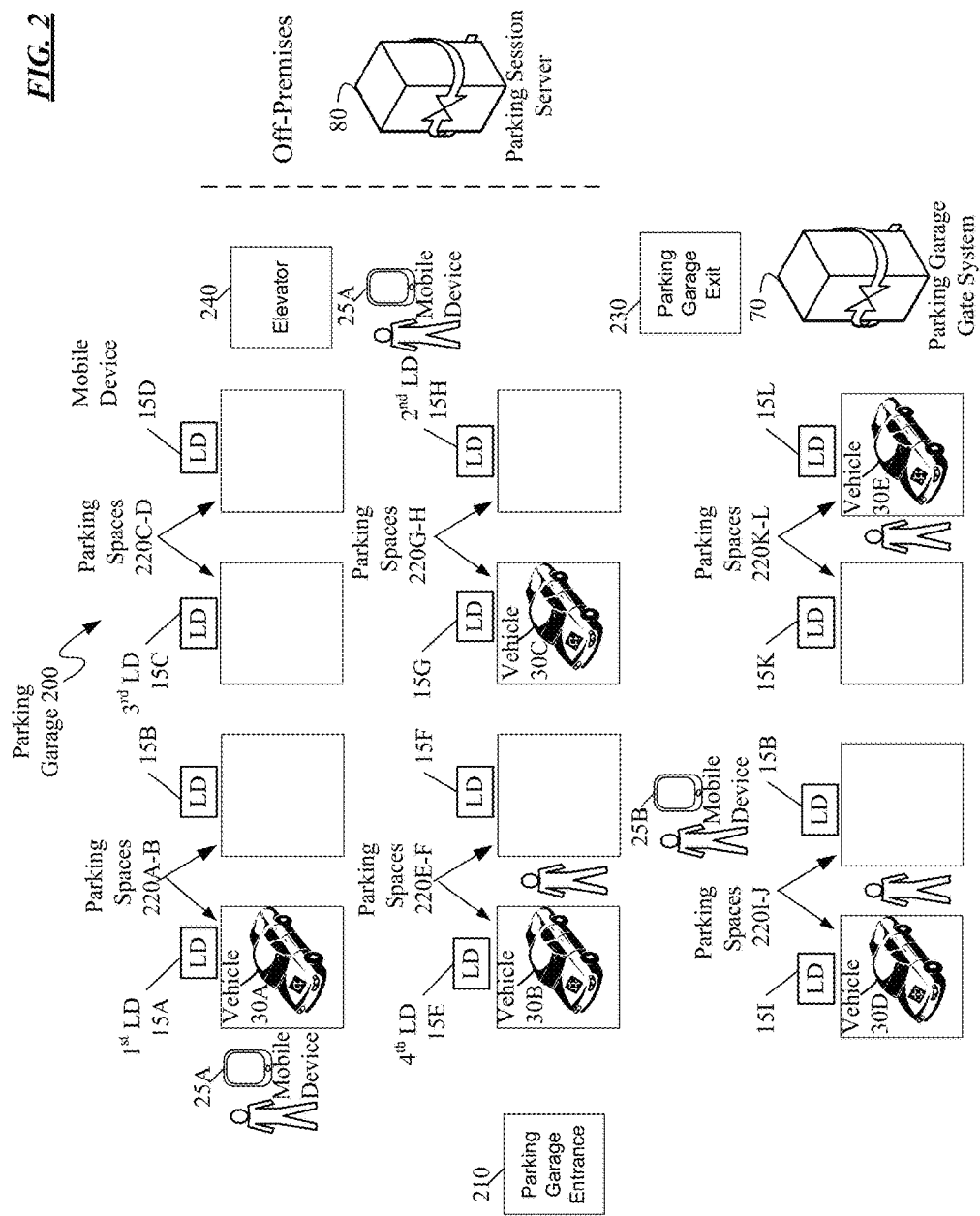
FIG. 2 is an example block diagram of lighting devices, mobile devices, and various networked devices as deployed in a parking garage that communicate via the lighting system of FIG. 1.

FIG. 2 is an example block diagram of lighting devices, mobile devices, and various networked devices as deployed in a parking garage that communicate via the lighting system of FIG. 1. As shown, the illustrated parking garage 200 includes a single parking garage level that includes parking spaces 220A-L, each of the parking spaces 220A-L includes a respective lighting device (LD) 15A-L. Typically, the lighting device 15A-L is installed such that it is surface mounted on the ceiling above the respective parking space 220A-L. The controllable general illumination lighting lights up the deck of the respective parking space 220A-L and the display is positioned vertically such that the display is visible to an observer passing by the respective parking space 220A-L.

As shown, parking spaces 220A, 220E, 220G, 220I, and 220L are occupied by vehicles 30A-E respectively and parking spaces 220B-D, 220F, 220H, 220J, and 220K are vacant, i.e., unoccupied. Two distinct users are shown on the premises and each of the users carries a respective mobile device 25A-B. The parking garage 200 includes a parking garage entrance 210, a parking garage exit 230 (shown as near the parking garage gate system 70), and an elevator 240. As noted above with respect to FIG. 1, each of the lighting devices 15A-L include a processor coupled to an occupancy sensor, a wireless communication interface system, a driver system, and a memory.

In an example, the processor of a lighting device 15A is configured to operate the general illumination light source and the display via the driver system and implement functions in stored programming. In an example, when the vehicle 30A enters the parking garage 200 via the parking garage entrance 210, the functions implemented by the processor of lighting device 15A include detecting via the occupancy sensor that a respective parking space 220A is vacant. In response to detecting via the occupancy sensor that the respective parking space 220A is vacant, the processor is configured to display a first visual indicator on the display to produce visible output via the display to provide a first visible cue indicating that the respective parking space 220A is vacant to a user of mobile device 25A that is being carried by a vehicle 30A.

The functions implemented by the processor of lighting device 15A further include subsequently detecting via the occupancy sensor that the vehicle 30A has parked in the respective parking space 220A. In response to detecting that vehicle 30A has parked in the respective parking space 220A, the processor is configured to operate the controllable general illumination light source to adjust a lighting state of the output illumination light. The lighting state adjustment produces visible output via the controllable general illumination light source and includes a change of intensity, color, or color temperature. Hence, when the user pulls into parking space 220A surround lighting is activated when the user gets out of vehicle 30A (or later reenters) because brighter illumination lighting provides a feeling of safety. Since lighting devices 15B-H are linked via a local network 50, the illumination lighting is adjusted to a brighter setting as the user approaches elevator 240 and passes by lighting devices 15B-H. In an example, focused light is placed on the vehicle 30A or light intensity is increased on the deck, for example, using beamshaping. Alternatively or additionally, an adjustment is made to the display.

Further in response to detecting that the vehicle 30A has parked in the respective parking space 220A, the processor is configured to display a second visual indicator on the display to produce visible output via the display to provide a second visible cue indicating that the respective parking space 220A is occupied. Further in response to detecting that the vehicle 30A has parked in the respective parking space 220A, the processor is configured to log a time of entry of the vehicle 30A into the respective parking space 220A in the memory.

In the example, the first and second visual indicators produced as the visible output via the display include a color change, blinking in a pattern, flashing, or light intensity change to provide the first or second visible cues indicating that the respective parking space 220A is vacant or occupied, respectively. For example, the first visual indicator displays the color green and the second visual indicator displays the color red.

As shown, a first lighting device 15A is located proximate a first parking space 220A that is occupied by the vehicle 30A and a second lighting device 15H is located proximate a second parking space 220H that is distant from the first parking space 220A. In our example, assume that the user of the mobile device 20A exits the vehicle 30A after parking in parking space 220A and then exits the parking garage 200 via the elevator 240. The processor of the second lighting device 15H is further configured to after a predetermined time period, detect that the user of the mobile device 25A has reentered the parking garage via the elevator 240 by communicating via the wireless communication interface system with the mobile device 25A of the user. For example, the mobile device 25A transmits a lighting device identifier of the first lighting device 25A to the second lighting device 25H after establishing a Bluetooth connection over a respective device network.

In response to detecting that the user has reentered the parking garage 200, the processor of the second lighting device 15H, operates the controllable general illumination light source to adjust the lighting state by increasing the light intensity of the output illumination light. Hence, when the user reenters the parking garage 200, the surround lighting is activated when the user is approaching vehicle 30A because brighter illumination lighting gives a feeling of safety. Since lighting devices 15B-H are linked via a local network 50, the illumination lighting is adjusted to a brighter setting as the user approaches parking space 220A and passes by lighting devices 15B-H.

Figure 11:
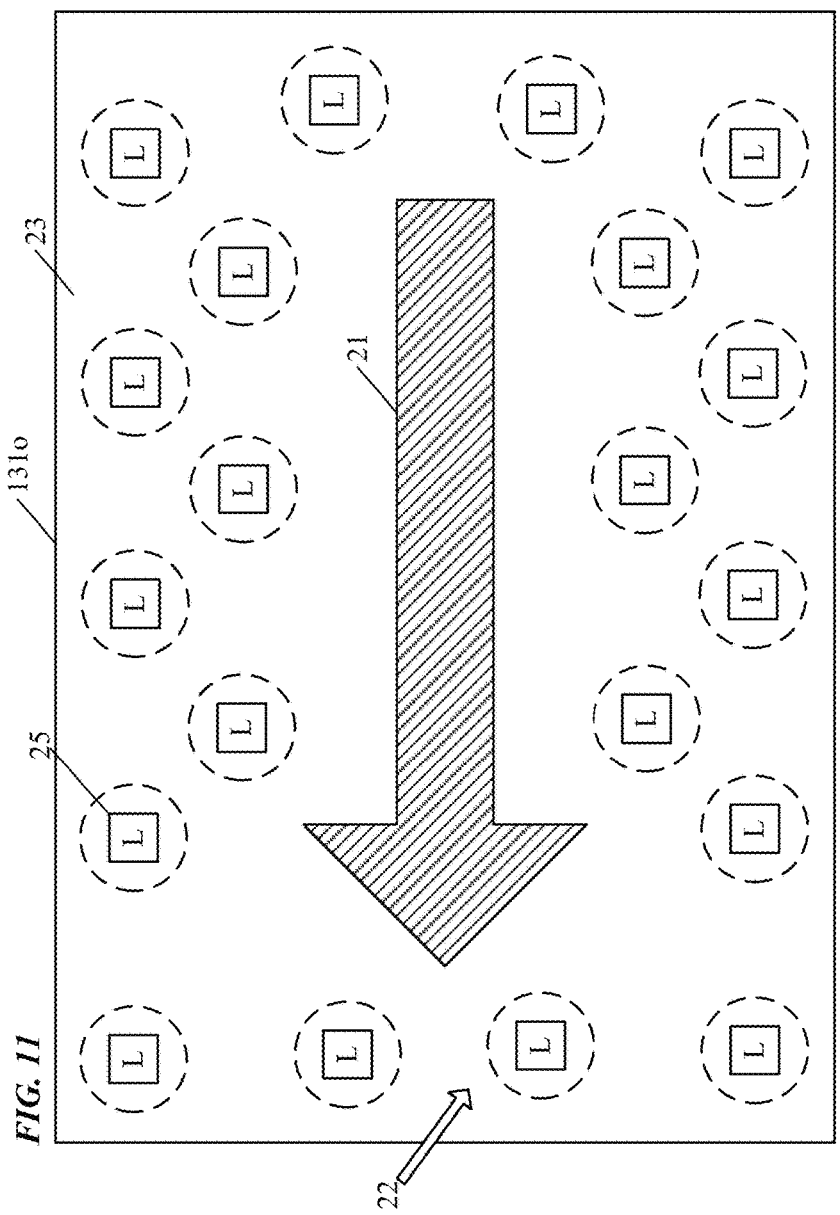
FIG. 11 is an example of a luminaire output displaying a visual direction indicator, as discussed in more detail later.

Further in response to detecting that the user has reentered the parking garage, the processor of the second lighting device 15H operates the display to provide a visual directional indicator to instruct the user of a direction of the first parking space 220A occupied by the vehicle 30A relative to the second lighting device 15H. Alternatively, the camera identifies the user via facial recognition techniques or other identifying attributes (e.g., clothes and hat), or electronic identifying information (e.g., Bluetooth). Based on the facial recognition, identifying attributes, or electronic identifying information, the display is operated to guide the user to the first parking space. The visual direction indicator produces visible output to the user via the display and the visible output is a relative direction or directional arrow shape to guide the user to the first parking space 220A and instruct the user of the direction of the first parking space 220A relative to the second parking space 220H. The visual direction indicator is the relative direction on a Cartesian coordinate system including left, right, forward, backward, up a level of the parking garage, or down a level of the parking garage. An example of a luminaire output displaying a visual direction indicator is shown in FIG. 11. VLC technologies for indoor positioning to determine the relative direction are available from Qualcomm Inc. under the trade name Lumicast™; however, positioning to determine the relative direction can also be done via Bluetooth, WiFi, GPS, etc.

When the user of the mobile device 20A exits the vehicle 30A after parking in parking space 220A and then exits the parking garage 200 via the elevator 240, a similar procedure occurs, for example, with lighting devices 15B-H directing the user of the mobile device 25A to the elevator 240 from the first parking space 220A. A visual direction indicator of the relative direction or directional arrow shape guides the user to the elevator 240 and instructs the user of the direction of the elevator 240 relative to the first parking space 220A.

As shown, a third lighting device 15C is located in the parking garage 200 proximate a third parking space 220C that is positioned in between the first 220A and second parking spaces 220H in the parking garage 200. The processor of the second lighting device 15H is configured to transmit a command to the third lighting device 15C via the wireless communication interface system to indicate that the user of the mobile device 15A has reentered the parking garage 200. The processor of the third lighting device 15C is configured to, in response to receiving the command that the user has reentered the parking garage 200 from the second lighting device 15H, operate the controllable general illumination light source of the third lighting device 15C to adjust the lighting state by increasing the light intensity of the output illumination light. In response to receiving the command that the user has reentered the parking garage from the second lighting device 15H, the processor of the third lighting device 15C is further configured to operate the display of the third lighting device 15C to provide a visual directional indicator to instruct the user of a direction of the first parking space 220A occupied by the vehicle 30A relative to the third lighting device 220C.

Each of the plurality of lighting devices 15A-L further includes a camera for visible light communication (VLC). The wireless communication interface system includes a modulator coupled to the display or the controllable general illumination light source. The processor is coupled to the camera and the modulator, and the processor is further configured to control the modulator to modulate intensity of visible light emitted by the display or the controllable general illumination light source for VLC. The processor of the second lighting device 15H is configured to communicate a command indicating that the user of the mobile device 25A has reentered the parking garage 200 by VLC to the third lighting device 15C.

VLC can be done in two different ways. For example, VLC can be done by transmitting modulated light through the display of the luminaire of second lighting device 15H, for example, having the display flicker. Alternatively, the general illumination lighting can output oscillating light (e.g., projection of a barcode on a ceiling of the parking garage) in combination with the deck lighting. Hence, the camera of the third lighting device 15C typically has a rotatable position to observe different vantage points of the deck lighting from various luminaires 15A-L for VLC.

The memory of the first lighting device 15A stores a map of the parking garage 200 with locations of the plurality of lighting devices 15A-L on different levels of the parking garage 200 and a respective visible light communication (VLC) identifier of each of the plurality of the lighting devices 15A-L. The processor of the first lighting device 15A sends via VLC with the mobile device 25A the respective VLC identifier of the first lighting device 15A in response to logging the time of entry of the vehicle 30A into the first parking space 220A. In response to receiving the first lighting device VLC identifier, the mobile device 25A stores the first lighting device VLC identifier.

The processor of each of the plurality of lighting devices 15A-L is configured to detect that the user of the mobile device 25A has reentered the parking garage by communicating via the wireless communication interface system with the mobile device 25A of the user and receive via the wireless communication interface system the first lighting device VLC identifier from the mobile device 25A. In response to receiving the first lighting device VLC identifier, the processor of each of the plurality of lighting devices 15A-L is configured to calculate a relative direction of the first parking space 220A relative to the respective lighting device 15A-L by comparing the first lighting device VLC identifier against a VLC identifier of the respective lighting device 15A-L on the map. Based on the calculated relative direction of the first parking space, the processor of each of the plurality of lighting devices 15A-L is configured to generate a visual directional indicator to instruct the user of the relative direction. The processor of each of the plurality of lighting devices 15A-L is configured to operate the display to produce the visual directional indicator as visible output to instruct the user of the relative direction of the first parking space 220A occupied by the vehicle 30A from the respective lighting device 15A-L.

In a somewhat different example, assume that when the user of the mobile device 25A entered the parking garage 200 to initially park the vehicle 300, a fourth parking space 220E proximate a fourth lighting device 15E is closer to an entrance 210 of the parking garage 200 than the first parking space 220A proximate the first lighting device 15A, but the fourth parking space 220E was occupied at that time by vehicle 30B. The memory of the fourth lighting device 15E stores a map of the parking garage 200 with locations of the plurality of lighting devices 15A-L on different levels of the parking garage 200 and a respective occupancy status of the respective parking space 220A-L of each of the plurality of lighting devices 15A-L. The processor of the fourth lighting device 15E is further configured to detect entry of the user of the mobile device 25A that is being carried by the vehicle 30A in the parking garage 200 by communicating with the mobile device 25A via the wireless communication interface system.

In response to detecting entry of the vehicle 30A in the parking garage 200, processor of the fourth lighting device 15E is further configured to guide the user to the first parking space 220A by checking against the map to determine a nearest vacant parking space to the vehicle 25A. The first parking space 220A of the first lighting device 15A is determined to be the nearest parking space. In response to determining the nearest vacant parking space to the vehicle, the processor of the fourth lighting device 15E is further configured to calculate a relative direction of the first parking space 220A relative to the fourth lighting device 15E. Based on the calculated relative direction of the first parking space, the processor of the fourth lighting device 15E is further configured to generate a visual directional indicator to instruct the user of the relative direction. The processor of the fourth lighting device 15E is then configured to operate the display to produce the visual directional indicator as visible output to instruct the user of the relative direction of the first parking space 220A from the fourth lighting device 15E.

In another example, in response to detecting that the vehicle 30A has parked in the first parking space 220A, the processor of the first lighting device 15A is further configured to activate a first parking session by communicating via the wireless communication interface system with the mobile device 25A of the user and a parking session server 80. The processor of the first lighting device 15A is further configured to receive a parking session expiration notification via the wireless communication interface system from the parking session server 80 indicating that a respective parking session of the vehicle 30A has expired.

In response to receiving the parking session expiration notification via the wireless communication interface system from the parking session server 80 that the respective parking session of the vehicle has expired, the processor of the first lighting device 15A is configured to detect that the vehicle 30A is still parked in the respective parking space 220A via the occupancy sensor. The processor of the first lighting device 15A is further configured to, in response to receiving the parking session expiration notification and detecting that the vehicle 30A is still parked in the respective parking space 220A via the occupancy sensor, operate the display to provide a third visible cue indicating that the parking session is expired.

The parking session server 80 includes a network communication interface system configured for data communication over a network with the plurality of lighting devices 15A-L and mobile devices 25A-B and a processor coupled to the network communication interface system. The parking session server 80 further includes a memory accessible to the processor and storing a set of parking sessions that includes the first parking session of the vehicle 30A occupying the first parking space 220A. Each of the set of parking sessions include: (i) a parking session identifier, (ii) a time of entry into a respective parking space 220A-L, (iii) a user selected amount of time to occupy the respective parking space 220A-L, (iv) a respective lighting device identifier, and (v) identification of a user of a respective mobile device 25A-B or a vehicle 30A-E occupying the respective parking space 220A-L. The lighting device identifier is a unique device identifier (e.g., alphanumeric) representing the lighting device on a given network, such as a serial number, media access control (MAC) address, IP address, VLC identifier, etc.

The parking session server 80 further includes programming in the memory which configures the parking session server 80 to perform functions, including functions to communicate with the mobile device 25A directly or indirectly via the first lighting device 15A to initiate the first parking session by generating (i) a first parking session identifier and receiving parking session parameters, including (ii) the time of entry in the first parking space 220A, (iii) a user selected amount of time to occupy the first parking space 220A, (iv) an identifier of the first lighting device 15A, and (iv) identification of the user of the mobile device 25A or the vehicle 30A occupying the first parking space 220A.

In response to communicating with the mobile device 25A to receive the parking session parameters, the programming further configures the parking session server 80 to store the received parking session parameters with the first parking session identifier as the first parking session. The programming is further configured to configure the parking session server 80 to determine that the first parking session has expired by adding the time of entry into the first parking space 220A and the user selected amount of time to occupy the first parking space 220A to calculate an expiration time, comparing the calculated expiration time with a current time, and determining that the calculated expiration time has elapsed relative to the current time. The programming is further configured to configure the parking session server 80 to, in response to determining that the first parking session has expired, send the parking session expiration notification via the wireless communication interface system to the first lighting device 15A indicating that the first parking session has expired.

In an example, the plurality of lighting devices 15A-L further comprise a camera. The fourth lighting device 15E is positioned behind a license plate of the vehicle 30A parked in the first parking space 220A. The processor of the first lighting device 15A is further configured to, in response to receiving the parking session expiration notification and detecting that the vehicle 30A is still parked in the respective parking space 220A via the occupancy sensor, transmit a command via the wireless communication interface system to the second lighting device 15E via the wireless communication interface system requesting that the second lighting device 15E operate the respective camera to photograph the license plate of the vehicle 30A occupying the first parking space 220A.

The processor of the second lighting device 15E is further configured to, in response to receiving the command via the wireless communication interface system to photograph the license plate of the vehicle 30A occupying the first parking space 220A from the first lighting device 15A, operate the respective camera of the second lighting device 15E to photograph the license plate of the vehicle 30A occupying the first parking space 220A. The processor of the second lighting device 15E is further configured to store the photograph of the license plate of the vehicle 30A occupying the first parking space 220A in the respective memory and send the photograph via the wireless communication interface system to the first lighting device 15A.

The processor of the first lighting device 15A is further configured to, in response to receiving the photograph of the license plate of the vehicle 30A occupying the first parking space 220A, store the photograph in the respective memory. The processor of the first lighting device 15A is further configured to transmit the photograph and an identifier of the first lighting device 15A via the wireless communication interface system to the parking session server 80.

In another example, the parking session server 80 includes a memory accessible to the processor storing programming and further storing: (i) a set of parking sessions of vehicles 30A-E having an associated parking session identifier, a lighting device identifier, and a state of pending, complete, or expired, wherein the set of parking sessions includes a first parking session of the vehicle 30A occupying the first parking space 220A, (ii) a set of photographs of vehicles determined to have parked in a respective parking space after expiration of a parking session, and (iii) a map of the parking garage 200 with respective locations and identifiers of the plurality of lighting devices 15A-L on different levels of the parking garage 200 and a respective occupancy status of the respective parking space 220A-L of each of the plurality of lighting devices 15A-L.

The processor of the first lighting device 15A is further configured to, after logging the time of entry of the vehicle 30A in the first parking space 220A in the respective memory, send the time of entry of the vehicle 30A and an identifier of the first lighting device 15A to the parking session server 80. The processor of the first lighting device 15A is further configured to, after a time period, detect via the occupancy sensor that the vehicle 30A has exited the first parking space 220A. In response to detecting that the vehicle 30A has exited the first parking space 220A, the processor of the first lighting device 15A is further configured to log termination of the parking session and a time of exit in the respective memory. The processor of the first lighting device 15A is further configured to send the time of exit and the identifier of the first lighting device 15A to the parking session server 80.

The programming implemented by the processor of the parking session server 80 configures the parking session server to perform functions, including functions to, in response to receiving the time of entry of the vehicle 30A, generate a first parking session with a first parking session identifier and the state as pending and store the first parking session identifier, the first lighting device identifier, and the time of entry as a pending parking session in the memory. In response to receiving the time of exit of the vehicle 30A, the programming implemented by the processor of the parking session server 80 configures the parking session server 80 to store the time of exit in the memory and change the state of the first parking session to complete.

As shown, the second lighting device 15H is more proximate the parking garage exit 230 of the parking garage 200 compared to the first lighting device 15A. The memory of the second lighting device 15H stores a map of the parking garage 200 with locations of the plurality of lighting devices 15A-L on different levels of the parking garage 200 and exits of the parking garage. After the parking session server 80 changes the state of the first parking session to complete, the processor of the second lighting device 15H is further configured to detect that the user of the mobile device 25A that is being carried by the vehicle 30A in the parking garage 200 is passing by the second lighting device 15H by communicating with the mobile device 25A via the wireless communication interface system.

In response to detecting the vehicle 30A is passing by the second lighting device 15H, the processor of the second lighting device 15H is further configured to guide the user to the parking garage exit 230 by checking against the map of exits to determine a nearest exit of the parking garage 200 and, in response to determining the nearest exit, calculate a relative direction of the nearest exit relative to the second lighting device 15H. Based on the calculated relative direction of the nearest exit, the processor of the second lighting device 15H is further configured to generate a visual directional indicator to instruct the user of the relative direction and operate the display to produce the visual directional indicator as visible output to instruct the user of the relative direction of the nearest exit from the second lighting device 15H.

As shown, the parking garage 200 includes a networked parking garage gate system 70 located at the nearest parking garage exit 230. The parking garage gate system 70 includes an electrically-controlled gate arm, a network communication interface system configured for data communication over a network with the parking session server 80, the mobile device 25A, and the plurality of lighting devices 15A-L, and a processor coupled to the network communication interface system and the electrically-controlled gate arm. A memory is accessible to the processor of the parking garage gate system 70 and stores programming and a list of parking session identifiers of the completed parking sessions, including the first parking session.

The programming implemented by the processor of the networked parking garage gate system 70 configures the networked parking garage gate system 70 to perform functions, including functions to communicate with the parking session server 80 via the network communication interface system to receive the completed parking session identifiers and communicate with the mobile device 25A or the second lighting device 15H to receive the first parking session identifier of the first parking session. The processor further configures the networked parking garage gate system 70 to determine whether to open the electrically-controlled gate arm by comparing the received first parking session identifier against the list of completed parking session identifiers.

Upon determining that the first parking session identifier is on the list of completed session identifiers, the processor further configures the networked parking garage gate system 70 to open the electrically-controlled gate arm. In response to opening the electrically-controlled gate arm, the processor further configures the networked parking garage gate system 70 to remove the first parking session identifier from the list of completed parking session identifiers and transmit a session termination command to the parking session server 80 indicating that the vehicle 30A associated with the first parking session has exited the parking garage 200. In response to receiving the session termination command from the networked parking garage gate system 70, the processor of the parking session server 80 is further configured to remove the first parking session from the set of parking sessions.

Figure 3:
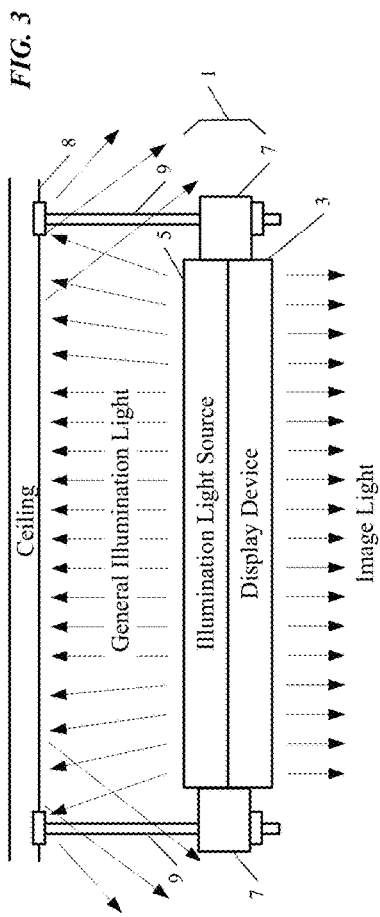
FIG. 3 is a simplified diagram of a luminaire an example of the lighting devices of FIGS. 1-2 that includes a display device and one or more light source components emitting light for a general illumination application.

FIG. 3 is a simplified diagram of a luminaire of the lighting devices of FIGS. 1-2 that includes a display device and one or more light source components emitting light for a general illumination application. In the example, the luminaire 1 is a suspended light fixture, e.g. a drop light.

The luminaire 1 includes a display device 3 as well as a light source 5 co-located with the display device 3 so that the display device 3 and the light source 5 are both elements of the luminaire 1. The display device 3 and the illumination light source 5 may be attached to or mounted in a common luminaire housing (not separately shown). The housing (or the display device 3 and/or the light source 5) includes or is attached to one or more support brackets 7, which provide attachment points for support(s), shown by way of example as rods or cables 9 in the first drawing. A variety of different arrangements or structures may be used in place of the housing, the brackets 7 and the rods/cables 9 to support the luminaire 1 at a desired height, in this example, below a location on the ceiling 8.

The display device 9 is configured to produce an image display output in a first direction. Any suitable display device may be used, such as a flat panel liquid crystal device (LCD) type display, a light emitting diode (LED) display, an organic light emitting diode (OLED) display, etc. Display devices of other shapes structures are shown and discussed relative to later examples. In the example of FIG. 3, the display device 9 is positioned below the ceiling 8 and oriented so as to emit the light for the displayed image downward. For other application examples, the display device 9 may have a different orientation to emit image light in different direction. The present examples also encompass arrangements that project the image onto another source, e.g. a surface of the ceiling, floor or other building structure in the vicinity of the luminaire. The direction of the image output, however, typically will enable a human observer to see and perceive the displayed image, for example at the display output or on a surface receiving a projected image, from at least some portions of the space illuminated by the luminaire 1.

The illumination light source 5 is configured to produce illumination light output, in this first example, with industry acceptable performance for a general lighting application. For example, for task lighting, the source 5 may produce a white light emitted toward a diffusely reflective ceiling surface of intensity sufficient that the light reflected downward from the ceiling 8 meets typical requirements for task lighting at a counter, desktop or floor level below the particular ceiling level.

The illustration shows arrows representing the image light output from the display device 3 in a first downward direction and the illumination light output produced by the light source 5 in a different second (generally upward) direction. The arrows show an implementation in which the light generation by source 5 and display device 3 are independent of each other, in that light from one is not shared with/used by the other in the generation of the respective light outputs. In such an implementation, for example, the display device 3 may include its own light generation system, e.g. a backlight or individual pixel level light generators. Such an arrangement, however, is a non-limiting example. The present concepts also encompass arrangements in which some light is shared between the illumination light source 5 and the display device 3. For example, if the display device 3 uses a controllable LCD panel requiring backlighting, the illumination light source 5 may be an OLED panel or the like configured to supply the backlighting to the LCD panel, in addition to providing the general illumination light output.

The illumination light source 5 may be adjustable in various ways. For example, source 5 may be selectively controlled for dimming of the downlight intensity and/or to control the color characteristic of the emitted light and thus the light reflected downward from the ceiling 8.

A variety of sources may be used, alone or in combination with other optical elements (not shown in this first illustration). The light source 5, for example, may be a flat panel fluorescent lamp, an LED or OLED type light panel or the like. Although shown as a single flat panel source of size similar to the display device, in this first example, a different sized source or a number of discrete sources may be used to form the overall illumination light source 5, for example, for different intended illumination applications of the luminaire 1. The light source 5 may extend across a substantial portion or all of the back surface (top surface in the illustrated orientation) of the display device 3 as shown, or the source 5 may be formed along limited areas of the display device surface or only at one or more discrete locations adjacent to that display device surface.

The illumination light output from the source 5 may be emitted in or directed (e.g. by optical component(s)) towards a second direction different from the first direction of the output of the image display light from the display device 9. In the example, the source 5 emits light in the second direction. In other examples shown/described later, one or more optical components are included in the luminaire to direct the illumination light from particular source components into the second direction. For example, the illumination light source 5 may have or be coupled to a reflector and/or one or more lenses etc. to direct and distribute the illumination light as appropriate for a particular intended illumination applications of the luminaire 1. Also, the source structure and/or the optical element(s) added to the source may enable selective control of the distribution (e.g. angle and/or shape) of the general illumination light output of the luminaire 1.

Although the light output from the illumination light source 5 may pass in other directions, in the illustrated example, the light source 5 emits at least a substantial portion of the illumination light output upwards towards the ceiling 8. Such an output from the illumination light source 5 is substantially opposite the direction (downward) of the image light output of display device 3. If the ceiling 8 is somewhat reflective, e.g. diffusely reflective white or pastel in color, much of the illumination light output from the light source 5 is reflected down and distributed around the perimeter of the luminaire for indirect downward illumination.

In this example, the configurable luminaire 1 provides a controllable downward display function. The display may output any still image or video, such as a still image of a sky or imagery of moving clouds in the sky or virtually any scene or video image desired by presentation in a particular space served by the luminaire 1.

The downward display and upward illumination light output are shown by way of example, and other orientations are feasible. For example, if the luminaire used a projector type display device and was inverted, the projector may present the image on the ceiling 8 while the illumination light source provides general illumination light output downward away from the ceiling 8.

Figure 4:
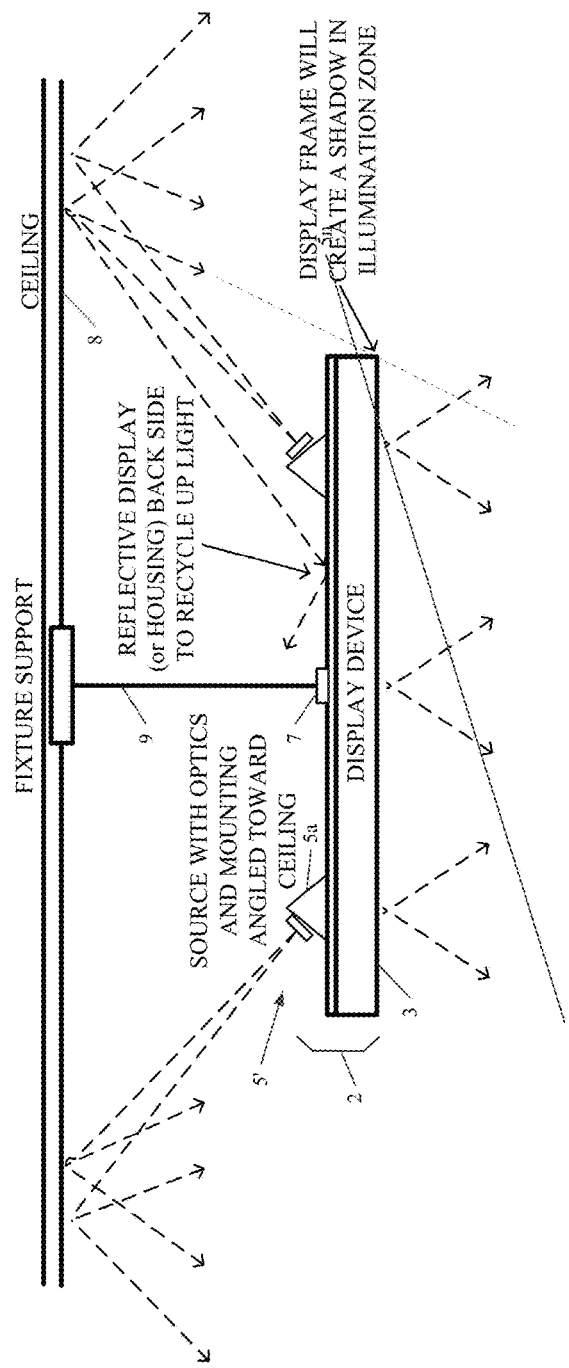
FIG. 4 is a side view of a somewhat different example of a luminaire of the lighting devices of FIGS. 1-2 combining a display device and components forming an illumination light source.

FIGS. 4 and 5A are side and isometric views respectively of a somewhat different example of a luminaire 2 combining a display device and components forming an illumination light source. Similar to the example of FIG. 3, the luminaire 2 includes a display device 3 oriented to emit image display light downward from the luminaire 2. In this example, the display device 3 is a flat panel display, such as a: LCD display, OLED display, LED display, plasma display, etc. In this second example, however, the luminaire 2 includes a light source 5' formed of a number of individual light sources 5a to 5n mounted on or adjacent to the back surface of the display device 3 or the housing (if separately provided) of the luminaire 2. Each of the light sources 5a to 5n may be an LED or an OLED, for example, coupled to fixed or variable optics for supplying light of desired distribution in one or more second directions (different from the direction of the light of the display image output). Other light sources and display devices may be used instead of or in addition to those noted here.

In the example of FIG. 3, the drop light fixture type luminaire 1 was hung below the ceiling 8 by multiple support rods or cables 9 attached to a number of brackets 7 on the luminaire 1. The example of FIGS. 4 and 5A represents a pendant type light fixture implementation of the luminaire 2 in which the fixture has a single bracket 7 or the like, on the surface opposite the display output, providing an attachment point for a single strut attached to or through the ceiling 8. Other aspects of structure, orientation and operation of the luminaire 2 are generally similar to those of the luminaire 1 discussed above.

In a luminaire like 1 with a broad illumination light source directing light toward the ceiling 8, the luminaire itself obstructs some light reflected back from the ceiling 8, creating shadow effect with respect to general illumination. The arrangement and orientation of the light source components 5a to 5n in the example of a luminaire 2 in FIGS. 4 and 5 may reduce this blockage and shadow effect relative to illumination light output from the light source 5'.

If the fixture is suspended low enough, and the light aimed at the ceiling 8 is wide enough in angle, scattered intensity may be reduced and display contrast may be good. Also, the separate locations of the light source and the display device and the separate directions of light outputs directions from the light source and the display device improves contrast when looking directly at the image display output. The displayed image may to be corrected by electronic processing to not affect overall color quality since lighting path to target is longer than that of display. Alternatively instead of being suspended, the luminaire 1 can be flush mounted on the ceiling, so that the illumination light sources are located on the edge of the luminaire of the lighting device and the illumination lighting grazes the ceiling as shown in FIGS. 5B-C.

For suspended applications like those in FIGS. 3 to 5, the display device can be selected to be light in weight to be supported properly, e.g. to reduce the size and/or complexity of the brackets and supports used to suspend the fixture below the ceiling 8. All wiring may reach the luminaire 1 or 2 through the support(s). Location of electronics should be decided (e.g. in ceiling or on fixture) size and weight considerations, since fixture weight may be an issue. For example, the electronics of the lighting device may be in the suspended luminaire portion or included in or near the support structure in our above the ceiling 8 to reduce the weight held below the ceiling by the support(s) and bracket(s).

FIG. 5B is a side or cross-sectional view, and FIG. 5C is a top plan view, of a section of an edge lit type transmissive lighting device and an associated LED type emissive display. This type of lighting device is colloquially referred to as "edge" lit or as an "edge light" in that the source of illumination light is coupled to a periphery, e.g. around an edge, of a waveguide that outputs the illumination light. In actual implementations, such as that shown, one or more light emitters that together form the source of illumination light are coupled to one or more lateral surfaces along the periphery of the waveguide, for example, formed between peripheral edges of longitudinal surfaces of the waveguide.

In the example of FIGS. 5B—C based on edge lighting, the luminaire 200 includes a lighting device 201 and an image display 203. The lighting device 201 is controllable to generate light for an illumination application of the luminaire 200. The lighting device 201 includes a source 205 of illumination light and a light transmissive element, in this example, in the form of a substantially transparent waveguide 207.

FIGS. 5B-C depict an enlargement of a section of a luminaire 200, e.g. showing limited portions and/or numbers of relevant components. Also, the plan view (FIG. 5C) shows a rectangular luminaire shape, although obviously the luminaire and appropriate components thereof may have other shapes, e.g. circular, oval square, hexagonal, etc. The drawings also show some representative examples of dimensions, although implementations of the luminaire may exhibit other sizes/dimensions.

The example includes a diffuser (221 in FIG. 5B). For convenience, the plan view (FIG. 5C) illustrates a view of components through a transparent implementation of the waveguide 207, e.g. as if the diffuser 221 is absent.

The source 205 of illumination light in the example includes a number of lighting LEDs 209, supported along the periphery of the waveguide 207 by one or more circuit boards 211. In a rectangular example like that shown, each of two circuit boards 211 support some number of the LEDs 209 along opposite lateral sides of the waveguide 207. In a typical LED based lighting device 201, the LEDs 209 may be white LEDs. In a tunable LED based lighting device 201, the LEDs 209 may be combinations of different types of LEDS, such as RGB (red/green/blue) LEDs, RBGW (red/green/blue/white) LEDs, or two or more types of white LEDs of different color temperatures. There may be only one LED, although as shown there typically are more LEDs 209. Other types of sources may be used, however, such as one or more organic light emitting diodes (OLEDs); one or more micro LEDs; one or more nanorod or nanowire LEDs; at least one fluorescent lamp; or at least one halogen lamp.

As noted, the luminaire 200 also includes the image display 203. Display 203 in the example is an emissive type display device, in that the display 203 emits light of the image rather than reflecting light to represent the image. The display 203 includes a number of pixels. In the example, each pixel has a number emitters for controllable emission of a corresponding number of different colors of light, e.g. RGB or RGBW. Although an OLED display, plasma display or other type of emissive display may be used, the example 203 uses a matrix of RGB LEDs 213. The LEDs 213 are supported by a grid 215, for example, at intersections of rows and columns of the grid 215. The grid 215 may be formed of suitable circuit board materials, to support the LEDs 215, provide connections to contacts of the LEDs as well also to run any necessary wiring from the drive circuitry to the LEDs 215. The circuit board(s) forming the grid 215 may also support some or all of the display driver circuity. The image display 203 is coupled to supply light of the selectable image to at least the transmissive element 207 of the body of the lighting device 201 for output as a visible image via the lighting device 201.

Light waveguides, also sometimes referred to as "light guides" or "light pipes," are known in the lighting arts. A light waveguide utilizes internal reflections governed by Snell's Law. A light waveguide may be fabricated of a clear light transmitting material, such as clear plastic or glass or acrylic, having opposing surfaces (top and bottom surfaces in the drawing) between which the light is internally guided. The waveguide body also includes one or more lateral surfaces through which light can be introduced into the guide from one or more light sources coupled to the 'edge' surface(s). Because of the high angle of incidence (angle from an axis perpendicular to the respective surface) of light rays at the longitudinal surfaces of the waveguide body, the light rays will internally reflect off of these surfaces and consequently will not escape the guide. In this way, the internal reflections, at longitudinal surfaces of the guide structure, channel or guide light introduced at one or more lateral or peripheral surfaces along the body of the waveguide, often without emerging from the guide's lateral surfaces except at desired specially configured output locations.

In the example of FIG. 5B, the light waveguide 207 therefore has a light transmissive body, an output surface 207*out* on the waveguide body, and an opposing surface 207*op* on the waveguide body opposite the output surface. The lighting LEDs 211 of the illumination light source 205 are optically coupled to supply illumination light to the waveguide via one or more waveguide input surfaces 207*i* for emission from the waveguide 207 via the output surface 207*out* as light for an illumination application of the luminaire. FIG. 5B shows dotted line/arrow examples of just few of the illumination light paths from a LED 211 on the left side of the drawing, through the waveguide 207 and out via the output surface 207*out*.

In the illustrated example, the body of the waveguide body is at least substantially planar. In the specific example shown, the longitudinal output surface 207*out* and the longitudinal opposite surface 207*op* are planar surfaces that are actually parallel to each other, although there may be some minor deviation due to the process of forming those surfaces of the material forming the body of the waveguide 207. There may also be applications in which either one or both surfaces on the body of the waveguide 207 has a non-planar contour, such as concave, convex or exhibiting a recurring waveform (e.g. sinusoidal or sawtooth).

One or more lateral waveguide input surfaces 207*i* extend along a periphery of the waveguide body including along at least a portion of each of the output surface 207*out* and the opposing surface 207*op*. Each waveguide input surface 207*i* extends between an edge of the output surface 207*out* and an edge of the opposite surface 207*op* along a portion of the periphery of the planar body of the waveguide 207. Various types of optical coupling techniques may be used along the waveguide input surface 207*i* to optimize the efficiency of extraction of light from the LEDs or the like forming the source 205 and coupling of such extracted light into the body of the waveguide 207. For example, the lighting device 201 may have an index of refraction matching material in between the emitter output of each LED 209 and a corresponding region of the light input surface 207*i* of the waveguide 207. The index of refraction of the material matches the index of refraction of the solid material (e.g. glass or acrylic) of the body of the waveguide 207. It may also be helpful to contour points on the light input surface 207*i*, e.g. with appropriate dimples, to conform to and provide improved optical coupling to the emissive surface of each illumination LED 209.

Light rays hitting a longitudinal surface 207*out* or 207*op* at an angle of incidence (relative to a line or axis perpendicular to the surface) greater than a critical angle of the particular material/structure of the waveguide 207 is reflected back within the waveguide 207, by total internal reflection (TIR). Light rays hitting a longitudinal surface at an angle of incidence less than the critical angle pass through the surface. In a pure waveguide arrangement, light introduced into the waveguide 207 on or about a line between and essentially parallel to the surfaces 207*out*, 207*op* of the waveguide (e.g. from emitters at locations similar to those shown for LEDs 213) may reflect one or more times and remain within the waveguide 207 across the entire longitudinal extent of the waveguide. If the opposite end of the waveguide also is reflective, light is reflected back and repeats the TIR channeling back in the opposite direction. For lighting applications or the like, features can be provided along one or both surfaces that change the reflective characteristic of the surface and the critical angle; and/or features provided along one or both surfaces may change the angle of light reflection within the waveguide and thus change the next angle of incidence of a light ray on a surface.

Hence, extraction of the illumination light from the waveguide 207 can be achieved by providing an optical mechanism for changing the manner in which the light rays pass through or reflect off one or the other of the longitudinal surfaces of the guide 207. Some extraction features may be provided at the output surface 207*out*; although in the example, diffuse optical processing is provided at the opposing surface 207*op* to decrease the angle of incidence of some light reaching the output surface. A variety of techniques for extracting light from a light waveguide are well known in the art.

In an example of diffuse reflection at the opposite surface, the opposing surface of the waveguide may have a layer of a light diffusing reflective material, which is bonded to this surface. For example, the bonded surface can be provided in the form of highly reflective diffuse paint, or a separate diffuse reflector element bonded to the surface by an optical adhesive having a reflective index that substantially matches the reflective index of the light waveguide. The surface may be treated to reduce internal reflectivity of the surface itself. The diffusely reflective layer changes the nature of the reflections at or from the opposing surface. The reflections are now diffuse in nature resulting in reflected light being scattered toward the output surface of the guide so as to increase the amount of light that strikes the output surface at low angles of incidence (closer to the perpendicular). The low angle incident light emerges from the output surface, which will cause the surface to illuminate and exhibit brightness. The component of diffused light coming off diffusely reflective material at high angles will continue to be piped down the waveguide for later diffusion and emission.

Other extraction techniques may be used. The example luminaire 200, with the incorporated display 203, utilizes a combination of extraction features 218 aligned with gaps 219 between the LEDs 213 forming the pixels of the matrix of the display 203 and diffuse reflectivity on portions (other than the LEDs 213) of the display 203.

The extraction features 218 in or associated with the waveguide 207 are aligned with the gaps 219, although the extraction features may not fully cover the respective gaps 219. The extraction features 218 may take the form of a treatment or structure formed in the waveguide 207 at the surface 207*op*, in appropriate regions of that surface 207*op* (hence, the illustration of the features 218 as being located within the waveguide 207 along and abutting the surface 207*op*). Extraction features could be frit produced by etching or the like, prismatic features, lens structures formed in or coupled to the surface, etc. formed in or located in an appropriate pattern along regions of the output surface 207*op* of the waveguide 207. The waveguide 207 thus may be described as a "patterned waveguide" with extraction features 218 of the pattern aligned with gaps 219 in the pixel matrix of the LED display 203. Other extraction technologies may be mounted on the outside of the waveguide 207 at appropriate locations on the surface 207*op*. The extraction features 218 break the TIR condition at the output surface 207*op* and allow light to couple out of waveguide 207, in this example, for reflection from reflective surfaces in the gaps (219) between display LEDs 213.

The reflectivity in the gaps 219 between the LEDs 213 at the pixels of the display 203 may be implemented in a variety of ways. In the example, surfaces of the column and row members of the grid 215 facing toward the surface 207*op* of the waveguide 207 may be reflective, e.g. coated with a reflective layer. In such an implementation, spaces between the column and row members of the grid 215 could be filled with a reflective material; or as in the example, the grid 215 may be backed by or supported on a suitable reflective element 217, such as a circuit board with a reflective coating layer on the surface (or surface portion(s)) thereof facing toward the surface 207*op* of the waveguide 207. The reflective material is highly reflective, for optimum efficiency; and the reflective material may be highly diffuse (e.g. Lambertian). For further discussion purposes, we will assume that the reflective material(s) forming the reflective element 217 provide white/diffuse reflectivity.

As outlined above, the illustrated example of the display 203 uses a grid 215 to support the LEDs 213. Other arrangements/configurations may be used to implement the LED based display. For example, the LEDs 213 may be mounted directly on a reflective board 217 (without the grid 215). In such an alternative implementation, wiring and possibly other circuitry may be provided on a back surface or on another board and connected to the LEDs 213 by conductors through vias extending through the board 217. In another approach, wiring lines connecting to the LEDs 213 may extend across the surface of the board 217 but be covered with a reflective layer in the areas where the LEDs are not mounted to the board.

A light ray from within the waveguide 207 hits an extraction feature 218 and passes through the surface 207*op*. The extraction feature 218 diffuses the ray as the ray passes through the surface 207*op*. Light the emerges through the surface 207*op* reflects off of the reflective surfaces in gaps (219) between display LEDs. This reflection may also tend to diffuse the light. The reflected light passes back through the feature 218 and may pass through other portions of the surface 207*op* into and through the transmissive body of the waveguide 207. Much of the reflected light has a smaller angle of incidence when transmitted through the waveguide 207 to the output surface 207*out*; and as a result, such light passes through surface 207*out* as illumination light output of the lighting device 201.

The extraction features 218 are distributed about the surface 207*op* and/or configured so as to promote uniform intensity output of the illumination light from the output surface 207*out* of the waveguide 207. For example, there typically is a space along each peripheral edge of the surface 207*op* that is free of any extraction feature, which helps mitigate against the appearance of high intensity ("hot spot") bands or regions along the edges of the output surface 207*out* of the waveguide 207. It may also be helpful to use features 218 of different sizes aligned with gaps 218 at different locations along the surface 207*op*, to increase uniformity of illumination light output. In the example, features 218 near the lateral edges adjoining the illumination light input surface are relatively small and fill less of the area corresponding to respective gaps 217. Approaching the center of the length (longitude) of the waveguide body, the size of the features 218 increases so as to fill more of the areas corresponding to respective gaps 217. In addition or instead of features of different sizes, the features at different locations across the surface may differ as to other extraction-related characteristics, e.g. more or less surface roughness (such as rougher features towards the middle).

Repeated light reflections, with attendant losses, within the waveguide 207 reduce the overall efficiency of the lighting device 201. The display LEDs 213 typically are not reflective, with respect to light from the opposite waveguide surface 207*op*, which leads to some loss of illumination light. Also, some light reflected from the reflective surfaces in gaps (219) between display LEDs 213 may reflect back off of the features 218 and/or areas of the surface 207*op*. Each reflection incurs some loss of illumination light. These losses between the waveguide surface 207*op* and the LEDs and reflective surfaces of the display 203 reduce the overall efficiency of the lighting device 201. Design of the elements of the luminaire 100 may be optimized and/or additional technologies added to reduce such losses and improve overall illumination efficiency of the luminaire 100.

The luminaire 100, in the example, further includes a diffuser 221, which further helps to homogenize output light for both illumination and image display. As shown in the drawing example, the diffuser 221 may be a separate sheet or layer, e.g. of a suitable white translucent material, adjacent to or formed on the output surface 207*out* of the waveguide 207. The diffuser 221, however, may be formed in other ways, for example, e.g. as frit produced by etching or the like, prismatic features, lens structures formed in or coupled to the surface, etc. across the output surface 207*out* of the waveguide 207.

For illumination, the diffuser 221 diffuses the illumination light output through the surface 207*out*, which improves uniformity of illumination light output intensity, as may be observed across the output through the surface 207*out* and/or as the illumination light is distributed at a working distance from the luminaire (e.g. across a floor or desktop).

For display, the diffuser 221 diffuses the image light from display 203 that has passed through the transmissive body of the waveguide 207. For some types/resolutions of the display, some degree of diffusion may be tolerable or even helpful. Use of higher resolution data to drive such an implementation of the display 203 may cause the image output to become pixelated. In some cases, the pixelation may prevent a person from perceiving the intended image on the display 203. Processing of the image data before application thereof to drive the pixel emitters of the display 203 and/or blurring of the output image by the diffuser 221 effectively blur discrete rectangles or dots of the pixelated image. Such blurring of the pixelated artifacts in the output image may increase an observer's ability to perceive or recognize the output image. An implementation of such a fuzzy pixels approach in a system 109 with a luminaire such as 200 may be implemented by a combination of downsampling of the image data and use of the diffuser 221 over the image display output via the surface 207*out*. Additional processing of the image data in the digital domain, e.g. Fourier transformation and manipulation in the frequency domain, may be implemented to reduce impact of low resolution image output on some types of display devices.

The example includes the diffuser 221, but the diffuser is optional. If not provided, the point sources of light, e.g. outputs from the LEDs 213, may be visible through the light transmissive body of the waveguide 207 and/or aspects of the extraction features 218.

In yet another approach without the separate diffuser, the output surface 207*out* may have a pattern of diffuse extraction features, with a some gaps between the surface portions aligned with the LEDs. There are multiple ways to implement the diffusion aspect of the fuzzy pixels concept by a combination of extraction features at the surface 207op and/or diffuser or pattern of diffusing features at or coupled to the output surface 207out.

Implementation of the luminaire 200 in a system, like system 109, would include circuitry like 113 coupled to the LEDs 209 of the source 205 and to the LEDs 213 of the image display 203 to drive and control operation of the source 205 and the light emissive display 203. In a manner similar to earlier discussions, the circuitry is configured to operate the lighting device 201 to generate the illumination light during an illumination state of the luminaire 200, and to operate the display 203 to emit the light of the image during an image display state of the luminaire 200.

The configurable luminaires 100 may be implemented using a variety of transmissive or transparent lighting device technologies. Several additional examples discussed below utilize various implementations of OLED (organic light emitting diode) panel type lighting devices.

Figure 6A:
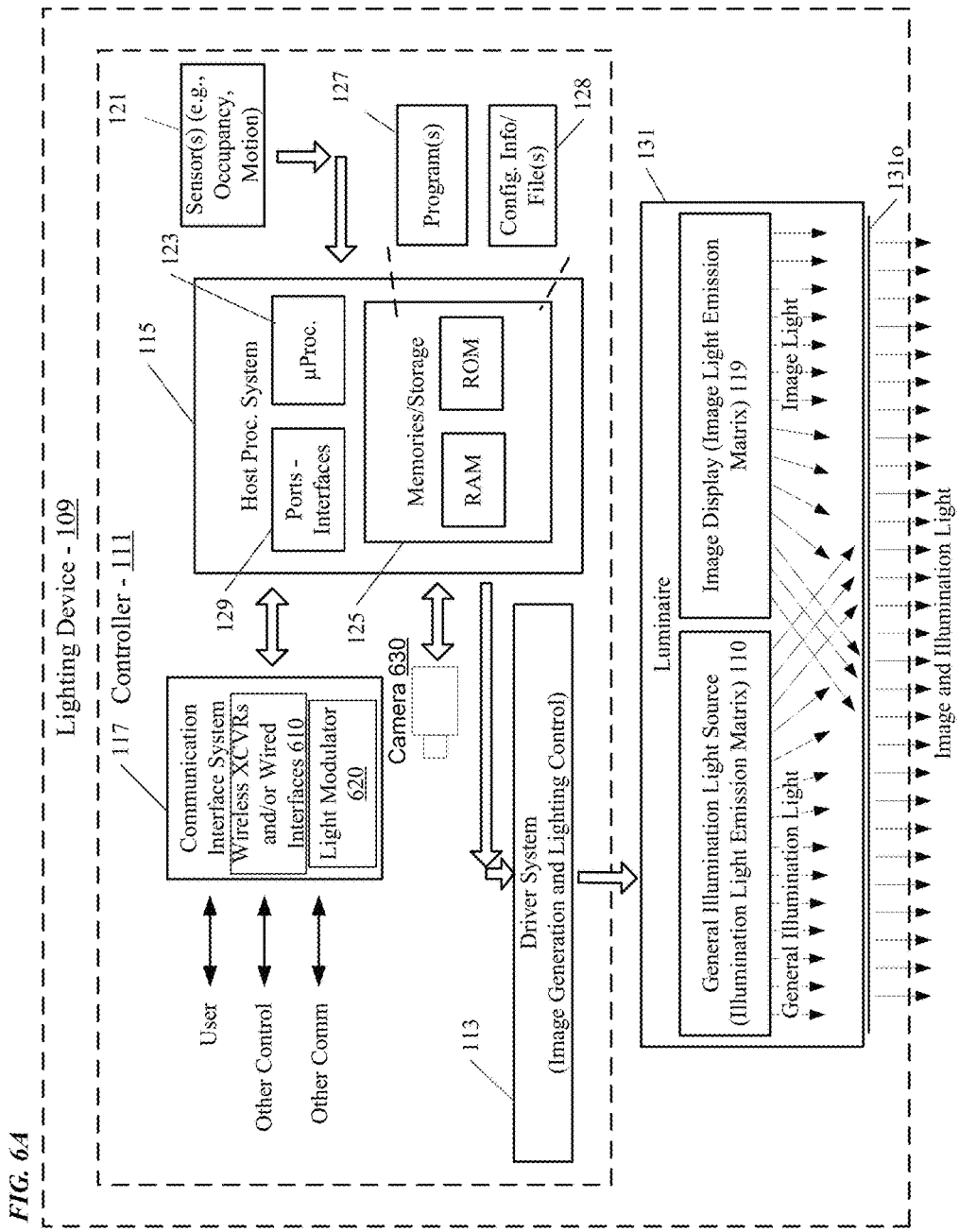
FIG. 6A is a high level functional block diagram of a lighting device of FIGS. 1-2 that includes a luminaire that may support concurrent display image light output and illumination light output and a controller of the lighting device is configured to implement the parking application.

FIG. 6A illustrates an example of a luminaire 131 as part of a lighting device 109 that also includes a controller 111. In the simplified block diagram example, the luminaire 131 includes a controllable general illumination light source 110, which includes a light emission matrix. The source 110 is configured to output illumination light from that light emission matrix via the luminaire output 131o. The luminaire 131 also includes a display 119, which includes a light emission matrix configured to output light from selected areas of that light emission matrix, through the luminaire output 131o, as a representation of an image. Display 119 is an emissive type display device controllable to emit light of a selected image, e.g. as a still image or a video frame. In most examples, the luminaire 131 includes two relatively separate and distinct emission matrices, although there may be additional emission matrices, or the emission matrices functionalities thereof may be combined into one physical matrix of suitable emitters. In the example with two physical matrices, for the general illumination light source and the display, the matrices are co-located such that an available output region of the illumination light emission matrix at least substantially overlaps an available output region of the display light emission matrix, as generally represented by overlapping emission arrows from the source 110 and the display 119 and by the arrows for combined light output from the luminaire output 131o.

The display 119 may be either a commercial-off-the-shelf image display type device or an enhanced display or the like specifically adapted for use in the luminaire 131. The image display 119 is configured to output light to present an image. The presented image may be a real scene, a computer generated scene, a single color, a collage of colors, a video stream, animation or the like. The emission matrix of the illumination light source 110 may be an otherwise standard general illumination system, of multiple individually controllable emitters. Several examples of the luminaire 131 in which the lighting device and/or the display are specifically configured for use together in a luminaire are discussed later.

The general illumination light from source 110 alone or in combination with light output from the display 119 illuminates a space, for example, in compliance with governmental building codes and/or industry lighting standards. The illumination light source 110 may have a maximum light generation capability at least at an intensity of 200 lumens. For general lighting examples, lumen outputs of the luminaire 131 may range from 200 to 1600 lumens for typical office or residential applications. Higher lumen outputs may be desirable for commercial or industrial general illumination. These represent examples only of possible maximum output intensities for general illumination, and the source 110 is controllable to provide lower intensity outputs, e.g. for dimming.

The lighting device 109 also includes a driver system 113 coupled to control light outputs generated by the first and second light emission matrices in the source 110 and the display 119. Although the driver system 109 may be separately located, in the example, the driver system 113 is implemented as an element of the controller 111. The driver system 113 may be implemented as an integrated driver circuit, although in many cases, the system 113 will include two separate driver circuits, one specifically adapted to provide suitable drive signals to the emitters of the particular implementation of the emission matrix of the general illumination light source 110 and another specifically adapted to provide suitable drive signals to the emitters of the emission matrix of the display 119. Although active-matrix driver circuitry may be used in the driver system 113, to drive one or both of the emission matrices, driver circuitry may, passive matrix driver circuitry may be used. For example, a passive matrix driver circuit may be a more cost effective solution to drive one or both of the emission matrices, particularly for any emission matrix that need not be dynamically controlled at a fast refresh rate. An issue with passive matrix is that the brightness scales with the number of rows in the emission matrix. It may be acceptable for a display but may not be acceptable for general illumination light source. Both active matrix and passive matrix can independently control pixel outputs, and thus they are the two main methods to create images for display. Either of these two methods may be used for driver circuity for the image display 119. For a driver circuit for the emission matrix of the general illumination light source 110, active matrix or passive matrix driving methods may not be required. For example, is some configurations of the source 110, general illumination light emitters are arranged together in a group forming a controllable row or a controllable column. Driving such a matrix then involves controlling a series of lighting emitters together instead of one emitter at each row and column intersection. In this later case, conventional pulse-width modulation driving circuity can tune the light intensity for a series of illumination lighting "pixels." This driving method is more energy efficient and more cost effective than current implementations of active matrix or passive matrix. In any event, the controllable luminaire 131 provides general illumination light output from the light source 110 in response to lighting control signals received from the driver system 113. Similarly, the controllable luminaire 131 provides image light output from the display 119 in response to image control signals received from the driver system 113.

As shown in FIG. 6A, the controller 111 also includes a host processor system 115 coupled to control operation of the driver system 113, and through the driver system 113 to control illumination and image light output from the luminaire 131. The controller 111 also includes a wireless communication interface system 117 and/or one or more sensors 121, such as occupancy or motion sensors. Other circuitry may be used in place of the processor based host system 115 (e.g. a purpose built logic circuit or an ASIC). In the illustrated example, the driver system 113 together with higher layer control elements of the device, such as the host processor system 115, serve as means for controlling the one or more matrices of light emitters with concurrently emitted light of the image to implement vehicle parking control strategies. With advances in circuit design, driver circuitry could be incorporated together with circuitry of the host processor system.

FIG. 6A also provides an example of an implementation of the high layer logic and communications elements to control luminaire operations. As shown in FIG. 6A, the example 111 of the controller includes the host processor system 115, one or more sensors 121 and the wireless communication interface system 117. Other implementations of the circuitry of the controller 111 may be utilized.

The circuitry of the controller 111 may be configured to operate the illumination light source 110 to generate the illumination light at least during an illumination state of the luminaire 131, and to operate the display 119 to emit the light of the image at least during an image display state of the luminaire 131. Although these illumination and display states could occur separately, e.g. at non-overlapping times, the vehicle parking control strategies under discussion here are applicable to states in which the luminaire 131 produces both types of light concurrently for simultaneous output at 131o.

In the example of FIG. 6A, the host processor system 115 provides the high level logic or "brain" of the controller 111 and thus of the lighting device 109. In the example, the host processor system 115 includes memories/storage 125, such as a random access memory and/or a read-only memory, as well as programs 127 stored in one or more of the memories/storage 125. The RAM can, for example, stores visual indicators, such as illumination lighting source states, a parking garage map, a respective lighting device identifier (e.g., VLC identifier or network IP address), parking session information (e.g., time of entry, time of exit, mobile device address), photographs or videos of parking enforcement violations by vehicles. The programming 127, in one example, configures the lighting device 109 to implement display and illumination via the controlled luminaire 131 using the parking application controls, as outlined in, for example, FIG. 2 above.

At a high level, the host processor system 115 is configured to operate the general illumination light source 110 and the display 119 via the driver system 113 to implement functions, including illumination and image output functions which also involve vehicle parking control strategies. For example, the first light emission matrix is operated so that the display 119 outputs the light of the image via an output 1310 of the luminaire 131. Based on a characteristic of the image output, the host processor system 115 selects an area of the output 1310 of the luminaire 131 where general illumination light output from the second light emission matrix (of the source 110) will not unduly interfere with the output light of the image by the first light emission matrix. While the first light emission matrix is emitting the light of the image, the luminaire 131 operates a portion of the second light emission matrix of the source 110, corresponding to the selected area of the luminaire output 131o, to emit the general illumination light via the selected area of the luminaire output 131o. Concurrently all unselected portions of the second light emission matrix of the source 110, are not selected and emitters in those portions do not operate.

More specifically, the host processor system 115 controls operation of the luminaire 131 based on image data and a general illumination light setting, which may be stored in memory 125 in the controller 111 or received as streaming data for temporary storage (buffering in local memory). Operation also is controlled, based on programming of the host processor system 115 and/or appropriate illumination source control data, to implement one or a combination of the vehicle parking control strategies as discussed herein.

Hence, the memories/storage 125 may also store various data, including luminaire configuration information 128 or one or more configuration files containing such information (e.g. an image, illumination setting data, communication configuration or other provisioning data, or the like) in addition to the illustrated programming 127. Light source control data may be generated or adjusted to implement vehicle parking control strategies. The relevant data may be generated remotely at a server or the like and implemented in the illumination setting data streamed or downloaded to the controller 111. Alternatively, the analysis of the image and associated control of the source 110 for vehicle parking control strategies may be implemented by the host processor system 115, based on appropriate programming 127 in memory 125.

Thus, programming or control data used by the host processing system 115 is configured to implement control of operation of a general illumination light source 110 of the luminaire 131 when outputting general illumination light responsive to a received or stored setting while a display 119 of the luminaire 131 is concurrently outputting light of an image based on received or stored image data. The control operation outputs the illumination light output with aspects of the displayed image light output, e.g. to implement one of the vehicle parking control strategies in the examples discussed above relative to FIGS. 1-5.

The host processor system 115 includes a central processing unit (CPU), shown by way of example as a microprocessor (µP) 123, although other processor hardware may serve as the CPU. The CPU and memories, for example, may be implemented by a suitable system-on-a-chip often referred to as a micro-control unit (MCU). In a microprocessor implementation, the microprocessor may be based on any known or available microprocessor architecture, such as a Reduced Instruction Set Computing (RISC) using ARM architecture, as commonly used today in mobile devices and other portable electronic devices. Of course, other microprocessor circuitry may be used to form the processor 123 of the controller 111. The processor 123 may include one or more cores. Although the illustrated example includes only one microprocessor 123, for convenience, a controller 111 may use a multi-processor architecture.

The ports and/or interfaces 129 couple the processor 123 to various elements of the lighting device 109 logically outside the host processor system 115, such as the driver system 113, the wireless communication interface 117 and the sensor(s) 121. For example, the processor 123 by accessing programming 127 in the memory 125 controls operation of the driver system 113 and thus operations of the luminaire 131 via one or more of the ports and/or interfaces 129. In a similar fashion, one or more of the ports and/or interfaces 129 enable the processor 123 of the host processor system 115 to use and communicate externally via the interface(s) 117; and one or more of the ports 129 enable the processor 123 of the host processor system 115 to receive data regarding any condition detected by a sensor 121, for further processing.

Sensor(s) 121 can be an in-fixture daylight sensor, an occupancy sensor, an audio sensor, a temperature sensor, or other environmental sensor. Sensor(s) 121 may be based on Acuity Brands Lighting's commercially available xPoint® Wireless ES7 product. Drive/sense circuitry (not shown), such as application firmware, drives the in-fixture occupancy, audio, and photo sensor hardware.

In the operational examples, based on its programming 127, the processor 123 processes data retrieved from the memory 123 and/or other data storage, and responds to illumination setting parameters in the retrieved configuration data 128 to control the light generation by the source 110. The light output control also may be responsive to sensor data from a sensor 126. The light output parameters may include either one or both of light intensity and light color characteristics of the light from source 110, either for overall light generated by the source 110 or a sub-groups of one or more emitters, among the matrix of emitters of the source 110. The illumination light setting parameters may also control modulation of the light output, e.g. to carry information on the illumination light output of the luminaire 131 and/or to spatially modulate illumination light output distribution (if the luminaire 131 includes an optical modulator, not shown). The configuration file(s) 128 may also provide the image data, which the host processor system 115 uses to control the display driver and thus the light emission from the image display 119.

In the examples of FIGS. 1-5, the lighting device 109 operates a selected number of the emitters of the second emission matrix of the general illumination light source 110; and the emitters operated to produce the general light output through selected areas of the luminaire output are selected so as to output the illumination light output with aspects of the displayed image light output to implement vehicle parking control strategies.

As noted, the host processor system 115 is coupled to the communication interface(s) 117. The communication interface(s) 117 can include multiple wireless transceivers (XCVRS) and/or wired communication interfaces 610, such as Ethernet. In the example, the XCVRS 610 include a wireless radio frequency (RF) communication interfaces for WiFi, Bluetooth, ZigBee, wireless mesh, or cellular data for communication between the plurality of lighting devices 15A-C, a parking garage gate system 70, or a parking session server 80.

The communication interface system 117 allows for data communication (e.g., wired or wireless) over all three types of networks: link network 40, local network 50, and device networks 60A-C of FIG. 1. For example, communication interface system 117 includes a tri-band wireless radio communication interface system configured for two-way wireless communication via separate radios that operate at three different frequencies, such as sub-GHz (e.g., 900 MHz), BLE (2.4 GHz), and 5 GHz, for example.

It should be understood that "tri-band" means communications over three separate RF bands. The communication over the separate RF bands can occur simultaneously (concurrently); however, it should be understood that the communication over the two separate RF bands may not actually occur simultaneously. In our example, controller 111 has a radio set that includes radio for sub-GHz communications and another radio for Bluetooth RF communications. A first transceiver, such as a 900 MHz wireless transceiver, issues control operations on the local network 50 with other lighting devices 15A-C and a gateway 60. A second transceiver 350, such as a 2.4 GHz BLE (Bluetooth) wireless transceiver carries out communications over a respective device network 60A-C to communicate with mobile devices 25A-C, sensors 28A-C, and vehicles 30A-C. A third transceiver can be for cellular data communication off the premises, for example, with parking session server 80.

The communication interface system 117 can also include a second optical wireless communication interface for visible light communication (VLC) for data communication with the plurality of lighting devices 15A-C or the mobile devices 25A-C. As shown, communication interface system 117 includes a light modulator 620. The light modulator 620 modulates an LED light source, such as general illumination light source 110 on and off to optically send light signals encoding data. The circuits comprising the light modulator 620 can include solid state transistors controlled by a digital input. Light modulator 620 turns general illumination light source 110 on and off by allowing or preventing current flow. When current flows through the light modulator with the switches closed the LEDs turn on, and when the switches are open in the modulator no current can flow and the LEDs turn off. When the modulator is controlled by an additional logic component, such as host processing system 115, it has the ability to send repeating patterns of on/off signals in order to transmit digital data through the visible light. The light modulator 620 interfaces directly in between the driver system 113, and is controlled by a microprocessor 123.

The microprocessor 123 provides the digital input signal to the light modulator 620. The microprocessor 123 sends a pre-determined sequence of signals to the light modulator 620 which then interfaces with driver system 113 to modulate the outgoing visible light from the general illumination light source 110. The microprocessor 123 provides the digital input signal to the light modulator 620. This function can also be achieved using a field programmable gate array (FPGA), but typically consumes more power with added complexity. The microprocessor's 123 task is to send a pre-determined sequence of signals to the light modulator 620 which then interfaces with the driver system 113 to modulate the outgoing visible light from the general illumination light source 110 or image display 119. As shown, the controller 111 also includes a camera 620, such as a rolling shutter camera for VLC communication purposes, and for taking photographs or videos of vehicles on the parking garage premises for parking enforcement purposes, for example.

In the example, the communication interface(s) 117 offer a user interface function or communication with hardware elements providing a user interface for the lighting device 109. The communication interface(s) 117 may communicate with other control elements, for example, a host computer of a building control and automation system (BCAS). The communication interface(s) 117 may also support device communication with a variety of other equipment of other parties having access to the lighting device 109 in an overall/networked lighting system encompassing a number of lighting devices 109, e.g. for access to each lighting device 109 by equipment of a manufacturer for maintenance or access to an on-line server for downloading of programming instruction or configuration data for setting aspects of luminaire operation, and further including a parking garage map, a respective lighting device identifier (e.g., VLC identifier or network IP address), parking session information (e.g., time of entry, time of exit, mobile device address), photographs or videos of parking enforcement violations by vehicles.

In an example of the operation of the lighting device 109, the processor 123 receives a configuration file 128 via one or more of the communication interfaces 117. The processor 123 may store, or cache, the received configuration file 128 in storage/memories 125. The file may include image data, or the processor 123 may receive separate image data via one or more of the communication interfaces 117. The image data may be stored, as part of or along with the received configuration file 128, in storage/memories 125. Alternatively, image data (e.g. video) and/or general illumination light setting data may be received as streaming data and used to drive the display 119 in real-time.

The driver system 113 may deliver the image data directly to the image display 119 for presentation or may convert the image data into a signal or data format suitable for delivery to the image display 119. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like. For example, if floating point precision is needed, options are available, such as OpenEXR, to store 32-bit linear values. In addition, the hypertext transfer protocol (HTTP), which supports compression as a protocol level feature, may also be used. For at least some versions of the display 119 offering a low resolution image output, higher resolution source image data may be down-converted to a lower resolution format, either by the host processor system 115 or by processing in the circuitry of the driver system 113.

For illumination control, the configuration information in the file 128 may specify operational parameters of the controllable lighting device 109, such as light intensity, light color characteristic, and the like for light from the source 119. The results of the vehicle parking control strategies, e.g. which emitters of the matrix of the source 110 are operating and which are not for a given image output by display 119, may be determined by the processor 123 or may be received as control data from another source/system/computer. The processor 123 by accessing programming 127 and using software configuration information 128, from the storage/memories 125, controls operation of the driver system 113, and through that driver system 113 controls the illumination light source 110, e.g. to achieve a predetermined illumination light output intensity and/or color characteristic for a general illumination application of the luminaire 131, including appropriate selections of output areas and operational states of emitters corresponding to those areas as discussed earlier.

A software configurable lighting device such as device 109 may be reconfigured, e.g. to change the image display output and/or to change one or more parameters of the illumination light output, by changing the corresponding aspect(s) of the configuration data file 128, by replacing the configuration data file 128, or by selecting a different file from among a number of such files already stored in the data storage/memories 125.

In other examples, the lighting device 109 may be programmed to transmit information on the light output from the luminaire 131. Examples of information that the lighting device 109 may transmit in this way include a code, e.g. to identify the luminaire 131 and/or the lighting device 109 or to identify the luminaire location. Alternatively or in addition, the light output from the luminaire 131 may carry downstream transmission of communication signaling and/or user data. The information or data transmission may involve adjusting or modulating parameters (e.g. intensity, color characteristic, distribution, or the like) of the illumination light output of the source 110 or an aspect of the light output from the display 119. Transmission from the display 119 may involve modulation of the backlighting of the particular type of display. Another approach to light based data transmission from the display 119 may involve inclusion of a code representing data in a portion of a displayed image, e.g. by modulating individual emitter outputs. The modulation or image coding typically would not be readily apparent to a person in the illuminated area who may observe the luminaire operations but would be detectable by an appropriate receiver. The information transmitted and the modulation or image codding technique may be defined/controlled by configuration data or the like in the memories/storage 125. Alternatively, user data may be received via one of the interfaces 117 and processed in the controller 111 to transmit such received user data via light output from the luminaire 131.

Apparatuses implementing functions like those of configurable lighting device 109 may take various forms. In some examples, some components attributed to the lighting device 109 may be separated from the source 110 and the image display 119 in the luminaire 131. For example, a lighting device 109 may have all of the above hardware components on or within a single hardware platform as shown in FIG. 6A or in different somewhat separate units. In a particular example, one set of the hardware components may be separated from one or more instances of the controllable luminaire 131, e.g. such that one host processor system 115 may control several luminaires 131 each at a somewhat separate location wherein one or more of the controlled luminaires 131 are at a location remote from the one host processor system 115. In such an example, a driver system 113 may be located near or included in a combined platform with each luminaire 131. For example, one set of intelligent components, such as the microprocessor 123, may control/drive some number of driver systems 113 and associated controllable luminaires 131. Alternatively, there may be one overall driver system 113 located at or near the host processor system 115 for driving some number of luminaires 131. It also is envisioned that some lighting devices may not include or be coupled to all of the illustrated elements, such as the sensor(s) 121 and the communication interface(s) 117. For convenience, further discussion of the lighting device 109 of FIG. 6A will assume an intelligent implementation of the lighting device 109 that includes at least the illustrated components.

In addition, the luminaire 131 is not size restricted. For example, each luminaire 131 may be of a standard size, e.g. 2-feet by 2-feet (2×2), 2-feet by 4-feet (2×4), or the like, and arranged like tiles for larger area coverage. Alternatively, one luminaire 131 may be a larger area device that covers a wall, a part of a wall, part of a ceiling, an entire ceiling, or some combination of portions or all of a ceiling and wall. Lighting equipment like that disclosed the example of FIG. 6A, may be used with various implementations of the luminaire 131.

Figure 6B:
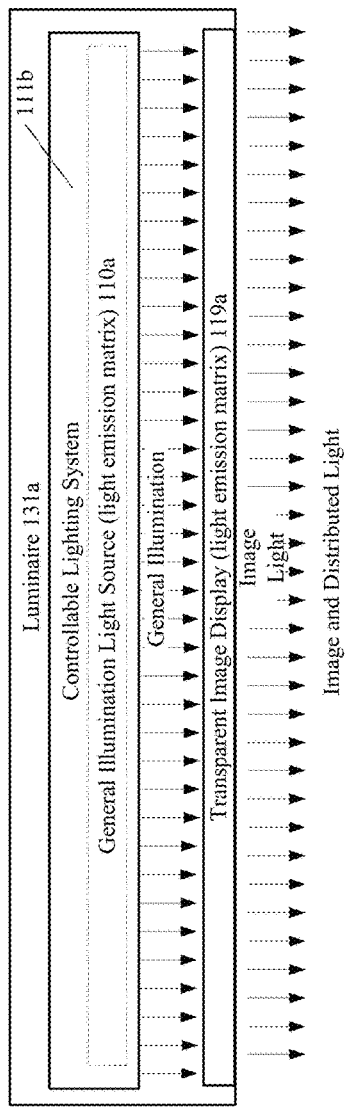
FIGS. 6B to 6D are functional block diagrams of different examples of the luminaire in the device of FIG. 6A, which may support concurrent display image light output and illumination light output.
Figure 6C:
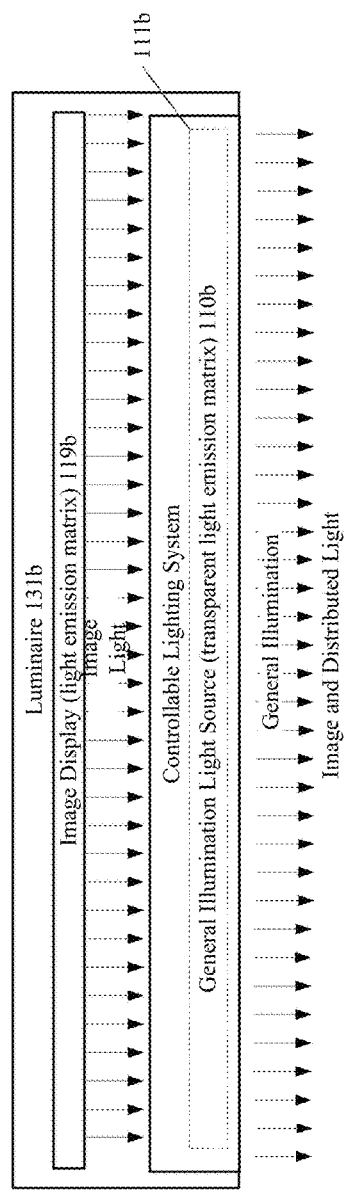
Figure 6D:
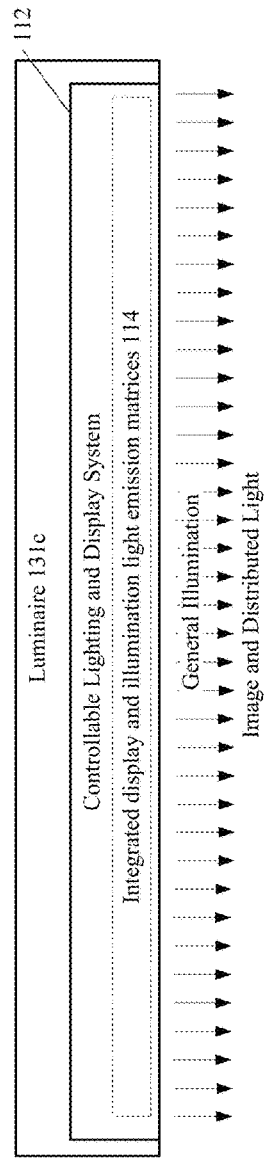

Although several examples of luminaire implementations have been briefly discussed above, it may be helpful to consider some examples in more detail. FIGS. 6B-D provide high level functional illustrations of several general categories of the various luminaire implementations.

In FIG. 6B, the luminaire 131*a* utilizes a transparent implementation of the display 119*a*, and illumination light from the general illumination light source 110 passes through and is combined with the image output light from the display 119*a*. At a high level, the controllable luminaire 111*a* provides general illumination lighting via general illumination source 110. The general illumination light source 110 is configurable with respect to light intensity. The light from the source 110 typically is white. The color characteristic(s) of the light from the source 110 also may be controllable. The general illumination light source 110 may include or be coupled to output the illumination light via an optical spatial modulator (not shown).

The transparent image display 119a may be either a commercial-off-the-shelf image display device or an enhanced transparent image display device that allows general illumination lighting generated by general illumination light source 110a to pass through. The general illumination lighting alone or in combination with light output from the display illuminates a space in compliance with governmental building codes and/or industry lighting standards. The illumination light source, for example, may support lumen output levels of 200 lumens or higher, with selective dimming capabilities. The image display 119a is configured to present an image. The presented image may be a real scene, a computer generated scene, a single color, a collage of colors, a video stream, or the like.

The present teachings also apply to luminaires in which the general illumination light source, with the second emission matrix, is transparent with respect to light from the matrix of the display. FIG. 6C is a high level block diagram illustration of an example of this approach. In such an implementation 131b of the luminaire, the second emission matrix may include a transparent emitter matrix of LEDs, OLEDs, etc. similar to any of the examples of the display emission matrix discussed above, to implement the general Illumination light source 110b. The second emission matrix of the general illumination light source may use a different number of emitters with different spacing between emitters and/or a different type of (e.g. higher intensity and/or different color, output distribution, etc.) specifically tailored to support the general illumination application of the light provided by the general illumination light source 110b. Although not shown, an optical spatial modulator (or array of modulator cells) may be provided in association with the source 110b.

The luminaire 131b also includes a display 119b, including a suitable image light generation matrix. The display 119b may be an off-the-shelf display.

The present teachings also encompass luminaire implementations 131c (FIG. 6D) in which a controllable lighting and display system 112 incorporates functions/emitters of the two matrices together at 114, for example on a single board. Although physically integrated, the emitters are logically operated as two independently controllable emission matrices (one for display and another for general illumination), including for the vehicle parking control strategies discussed herein. Hence, the vehicle parking control may be implemented using the luminaire 131c with integrated emission matrices in a manner similar to the examples outlined so far.

Figure 7:
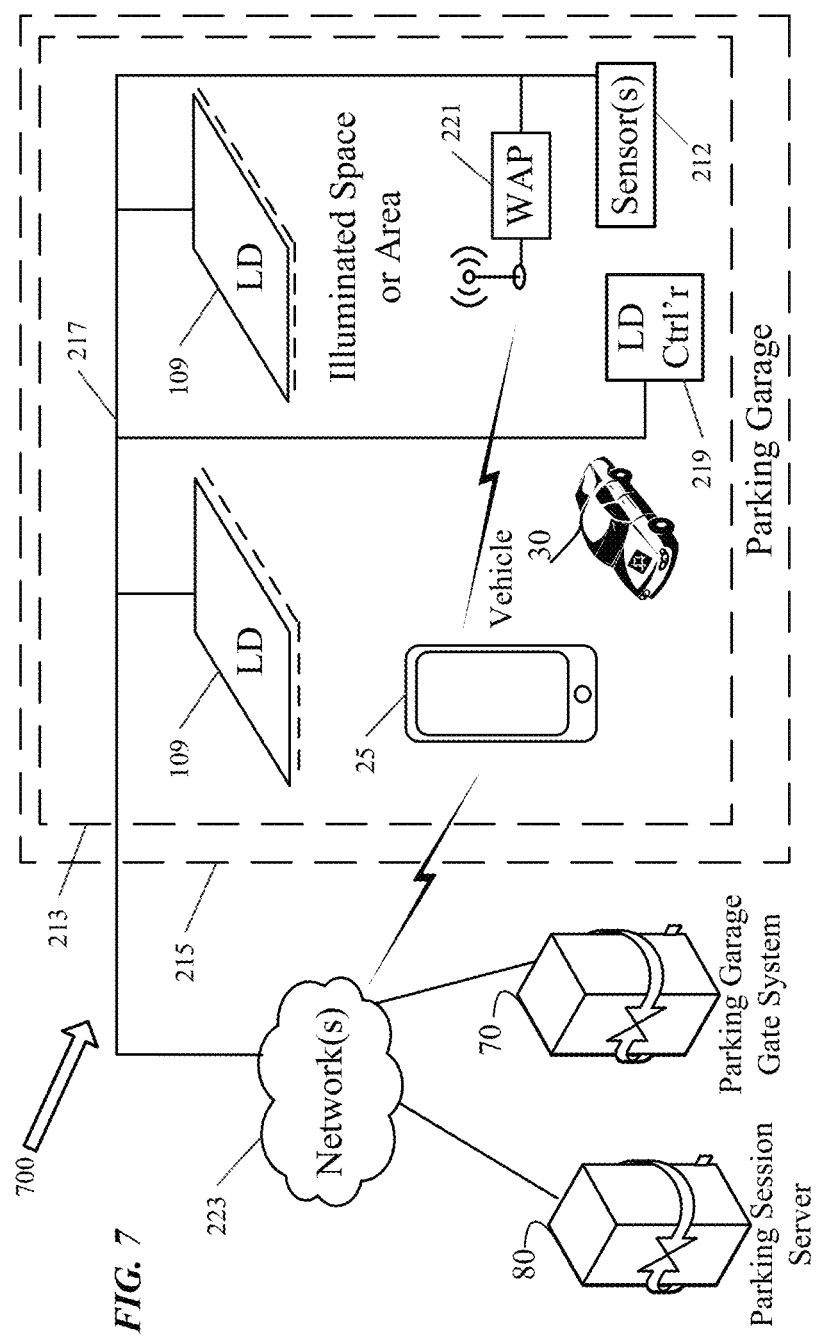
FIG. 7 is a high-level functional block diagram of a vehicle parking system including a number software configurable lighting devices that may display an image and provide general illumination.

It may be helpful to consider a high-level example of a system including software configurable lighting devices 109, with reference to FIG. 7. That drawing illustrates a lighting system 700 for providing configuration or setting information, e.g. based on a user selection, to at least one software configurable lighting device (LD) 109 of any of the types discussed herein, including devices 109 configured to implement one or more of the vehicle parking control strategies.

The system example 700 shown in the drawing includes a number of such lighting devices (LD) 109. For purposes of discussion of FIG. 7, it is assumed that each software configurable lighting device 109 generally corresponds in structure to the block diagram illustration of a lighting device 109 in FIG. 6A, with the illumination light source and display device structured/located to operate as a luminaire 131 as discussed in various other examples above. The example of the lighting system 700 in FIG. 7 also includes a number of other devices or equipment configured and coupled for communication with at least one of the software configurable lighting devices 109.

In the lighting system 700 of FIG. 7, the software configurable lighting devices 109, as well as some other elements of system 700, are installed within a space or area 213 to be illuminated at a parking garage premises 215. The premises 215 may be any location or locations serviced for lighting and other purposes by such a system 700 of the type described herein. Lighting devices, such as lighting devices 109, that are installed to provide general illumination lighting in the premises 215 typically comply with governmental building codes (of the respective location of the premises 215) and/or lighting industry standards. Most of the examples discussed below focus on building installations in a parking garage, for convenience, although the system may be readily adapted to outdoor lighting.

Hence, the example of lighting system 700 provides configurable lighting (illumination and display) and possibly other services in a number of service areas in or associated with a building, such as various rooms, hallways, corridors or storage areas of a building and an outdoor area associated with a building. Any building forming or at the premises 215, for example, may be an individual or multi-resident dwelling or may provide space for one or more enterprises and/or any combination of residential and enterprise facilities. A premises 215 may include any number of such buildings, and in a multi-building scenario the premises may include outdoor spaces and lighting in areas between and around the buildings, e.g. in a campus (academic or business) configuration.

The system elements, in a system like lighting system 700 of FIG. 7, may include any number of software configurable lighting devices 109 as well as one or more lighting device controllers 219. The lighting controller 219 may be an automated device for controlling lighting, e.g. based on timing conditions; and/or the lighting controller 219 may provide a user interface. Lighting controller 219 may be configured to provide control of lighting related operations (e.g., ON/OFF, intensity or brightness, color characteristic(s), etc.) of any one or more of the lighting devices 109. A lighting controller 219, for example, may take the form of a switch, a dimmer, or a smart control panel including a graphical, speech-based and/or touch-based user interface, depending on the functions to be controlled through device 219.

A lighting device 109 may include a sensor (e.g., as in FIG. 1). In the example, other system elements may also include one or more standalone implementations of sensors 212. Sensors, for example, may be used to control lighting functions in response to various detected conditions, such as occupancy or ambient light. Other examples of sensors include light or temperature feedback sensors that detect conditions of or produced by one or more of the lighting devices. If separately provided, the sensors may be implemented in intelligent standalone system elements such as shown at 212 in the drawing. Alternatively, sensors may be incorporated in one of the other system elements, such as one or more of the lighting devices 109 and/or the lighting controller 219.

The on-premises system elements 109, 212, 219, in a system like the system 700 of FIG. 7, are coupled to and communicate via a data network 217 at the premises 215. The data network 217 may be a wireless network, a cable network, a fiber network, a free-space optical network, etc.; although the example shows connection lines as may be used in a hard-wired or fiber type network implementation.

The data network 217 in the example also includes a wireless access point (WAP) 221 to support communications of wireless equipment at the premises. For example, the WAP 221 and network 217 may enable a mobile device 25 or vehicle 30 to communicate with any lighting device 109 at the premises 213. Such a device is depicted in FIG. 7, for example, as a mobile device 25 or vehicle 30 within the parking garage premises 215, although any appropriate device may be utilized. However, the ability to communicate with a lighting device 109 may not be limited to mobile device 25 accessing data network 217 via WAP 221 or other on-premises point of access to the network 217, for example, communication can be via VLC. Network(s) 223 may include, for example, a local area network (LAN), a metropolitan area network (MAN), a wide area network (WAN) or some other private or public network, such as the Internet.

Data network communications allow installation of configuration files or streaming of configuration instructions/data to the lighting devices 109 at the premises. Such data communications also may allow selection among installed configuration files in any lighting device 109 that stores more than one such file. In another example, a memory device, such as a secure digital (SD) card or flash drive, containing configuration data may be connected to one or more of the on-premises system elements 109, 212 or 219 in a system like system 700 of FIG. 7.

For lighting operations, the system elements (109, 212 and/or 219) for a given service area 213 are coupled together for network communication with each other through data communication media to form a portion of a physical data communication network. Similar elements in other service areas of the premises are coupled together for network communication with each other through data communication media to form one or more other portions of the physical data communication network at the premises 215. The various portions of the network in the service areas in turn are coupled together to form a data communication network at the premises, for example to form a LAN or the like, as generally represented by network 217 in FIG. 7. Such data communication media may be wired and/or wireless, e.g. cable or fiber Ethernet, Wi-Fi, Bluetooth, or cellular short range mesh. In many installations, there may be one overall data communication network 217 at the premises. However, for larger premises and/or premises that may actually encompass somewhat separate physical locations, the premises-wide network 217 may actually be built of somewhat separate but interconnected physical networks utilizing similar or different data communication media.

System 700 also includes a parking garage gate system 70 and a parking session server 80. Although FIG. 7 depicts parking garage gate system 70 and parking session server 80 as located outside premises 215 and accessible via network(s) 223, this is only for simplicity and no such requirement exists. Typically, parking garage gate system 70 is located within premises 215. Moreover, parking session server 80 may be located within premises 215 and accessible via network 217. In still another alternative example, parking garage gate system 70 and parking session server 80 may be located within any one or more system element(s), such as lighting device 109, lighting controller 219 or sensor 212.

The software configurable lighting device 109 is configured to set illumination light generation parameters of the light source and possibly set modulation parameters for any spatial modulator in accordance with a selected configuration information file. For example, a selected configuration information file from the database may enable a software configurable lighting device 109 to achieve a performance corresponding to a selected type or of existing hardware luminaire for a general illumination application or any other arbitrarily designed/selected general illumination performance. Thus, the combination of the database accessible via a server may represent a "virtual luminaire store" (VLS) or a repository of available configurations that enable a software configurable lighting device 109 to selectively function like any one of a number of real or imagined luminaires represented by the available illumination configurations.

It should be noted that the output performance parameters for general illumination need not always or precisely correspond optically to an emulated luminaire. For a catalog luminaire selection example, the light output parameters may represent those of one physical luminaire selected for its light characteristics whereas the distribution performance parameters (if the lighting device incorporates spatial optical modulation) may be those of a different physical luminaire or even an independently determined performance intended to achieve a desired illumination effect in area 213. The light distribution performance, for example, may conform to or approximate that of a physical luminaire or may be an artificial construct for a luminaire not ever built or offered for sale in the real world.

It should also be noted that, while various examples describe loading a single configuration information file onto a software configurable lighting device 109, this is only for simplicity. Lighting device 109 may receive one, two or more configuration information files and each received file may be stored within lighting device 109. In such a situation, a software configurable lighting device 109 may, at various times, operate in accordance with configuration information in any selected one of multiple stored files, e.g. operate in accordance with first configuration information during daylight hours and in accordance with second configuration information during nighttime hours or in accordance with different file selections from a user operator at different times for different intended uses of the space 213. Alternatively, a software configurable lighting device 109 may only store a single configuration information file. In this single file alternative situation, the software configurable lighting device 109 may still operate in accordance with various different configuration information, but only after receipt of a corresponding configuration information file which replaces any previously received file(s). In a further alternative, some or all of the relevant configuration information may be streamed to a lighting device more or less in real time.

Figure 8:
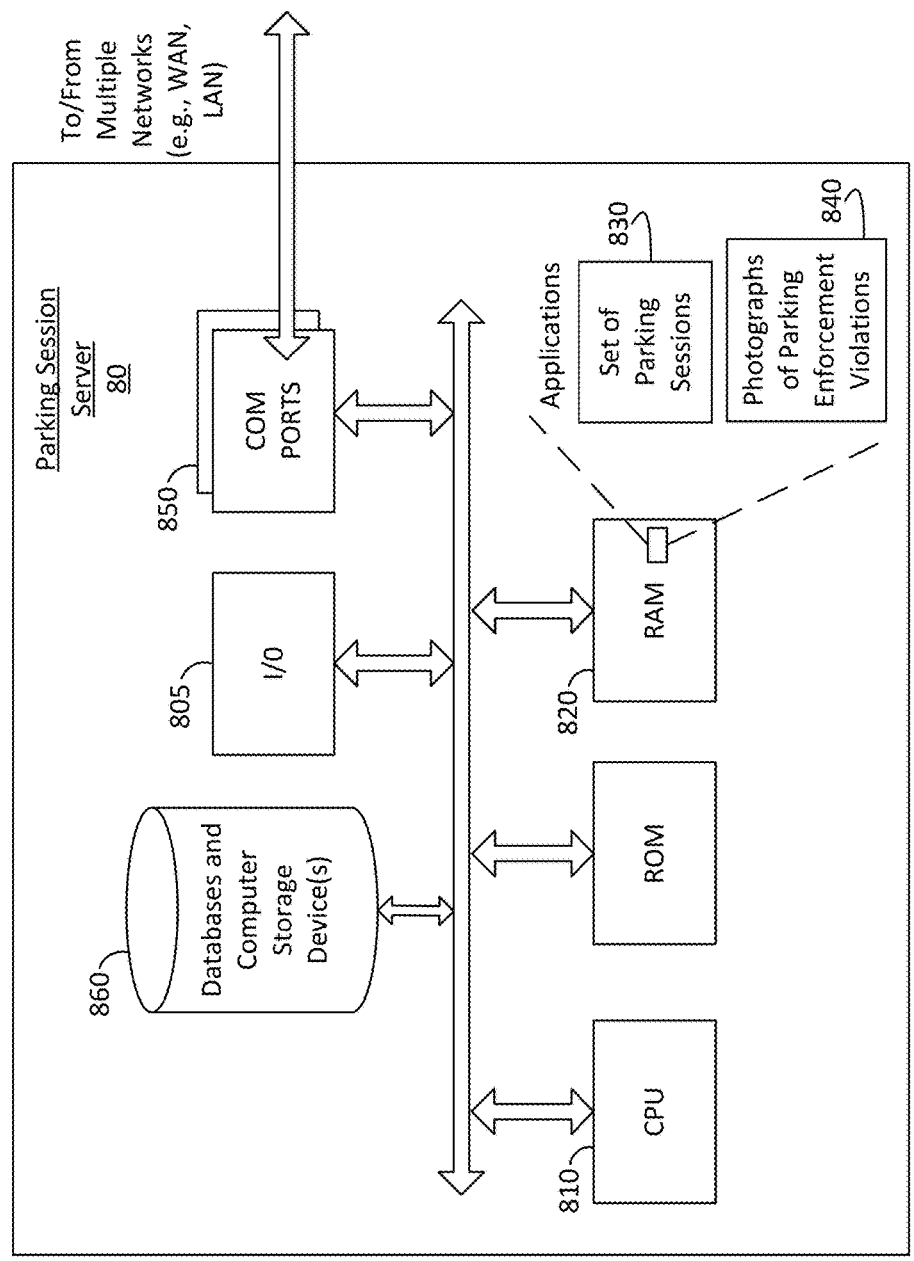
FIG. 8 shows an example of a hardware configuration for the parking session server in FIG. 1, in simplified block diagram form.

FIG. 8 shows an example of a hardware configuration for the parking session server 80 in FIG. 1, in simplified block diagram form. The parking session server 80 may be configured as a server or host to function as any of the computer platforms in FIG. 1. For example, the gateway 60 shown in the system of FIG. 1 may be implemented in a somewhat similar fashion, although the gateway 80 is typically optimized for routing and related network services or the like.

The parking session server 80 includes a CPU 810, in the form of one or more processors, for executing program instructions. Although the processor(s) forming the CPU 810 may be similar to the processor used in the mobile devices, host or server computer platforms typically use somewhat different circuit architectures, e.g. to provide more processor power. Parking session server 80 also includes a memory 820, such as RAM, that is accessible to the processor to temporarily store a set of parking sessions 830, photographs of parking enforcement violations 840 and execute various programming instructions, for example, applications. The memory 820 typically stores programming, such as for the vehicle parking control strategies disclosed herein. Execution of the programming by the processor 810 configures the parking session server 80 to perform the functions or procedures as described above, for example in FIGS. 1-2.

The parking session server 80 platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

In this example, the parking session server is shown as including the databases and computer storage device(s) 860, such as to persistently store the set of parking sessions, photographs of parking enforcement violations in the form of databases, for example. The databases and computer storage device(s) 860 are accessible to the central processing unit (CPU) 810 of the parking session server 80.

Parking session server 80 includes a network communication interface, shown generally as com ports 850, such as coaxial, optical, Ethernet, and/or wireless LAN communication ports. The com ports 850 may use any available data communication technology, including VLC or cellular. In a fixed installation, for example, the com ports 850 may include an Ethernet interface card for communication over appropriate data network wiring. For a wireless implementation, the com ports 850 may include a Wi-Fi, VLC (e.g., light modulator and camera), or cellular data transceiver. Com ports 850 allow the parking session server 80 to communicate with other devices and systems, such as lighting devices 15A-C, parking garage gate system 70, mobile devices 25A-C, or vehicles 30A-C, for example, via the link network 40.

The parking session server 80 also includes a user I/O device 805. The user I/O device 805 may include a liquid crystal device (LCD) or light emitting diode (LED) display for displaying information pertaining to vehicle parking session control strategies to a user.

Figure 9:
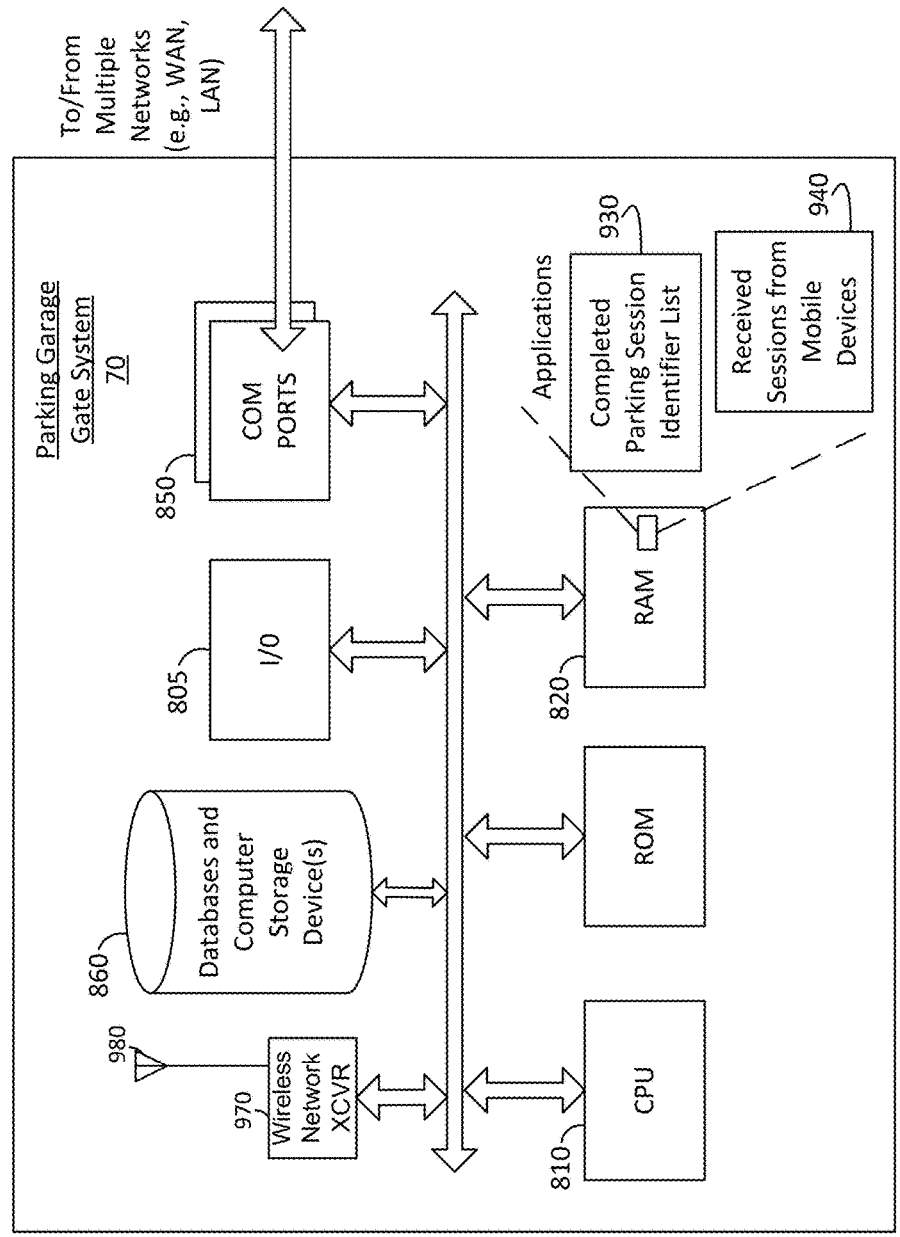
FIG. 9 shows an example of a hardware configuration for the networked parking garage gate system in FIG. 1, in simplified block diagram form.

FIG. 9 shows an example of a hardware configuration for the parking garage gate system 70 in FIG. 1, in simplified block diagram form. Similar to parking session server 80 of FIG. 8, the parking garage gate system 70 includes a CPU 810, I/O device 805, RAM 820, com ports 850, and databases and computer storage device(s) 860. The RAM stores applications to implement the vehicle parking control strategies outlined in FIGS. 1-2 above, a completed parking session identifier list 930, and received session identifiers from mobile devices 940. The databases and computer storage device(s) 860 can store the completed parking session identifier list 930 and received session identifiers from mobile devices 940 in a persistent form.

The example parking garage gate system 80 can also include an embedded wireless network transceiver 970 that is a short range wireless transceiver that includes antenna 980 and is configured to communicate with an electrically-controlled gate arm, as well as lighting devices 15A-C, mobile devices 25A-C, and vehicles 30A-C, for example, via the local network 50. The various wireless network technologies may include (but are not limited) to: WiFi, ZigBee, Bluetooth, DECT, and NFC. In an example, the wireless network transceiver 970 transmits a radio signal that is sent to an XCVR box which is mounted on an electrically-controlled gate arm (not shown). The XCVR of the electrically-controlled gate arm carries the message to a control box that activates a circuit which initiates movement in the gate opener arm. The arm physically swings or slides the gate open to allow a vehicle to exit or enter the parking garage. The gate can be set to close automatically after an allotted amount of time.

Figure 10:
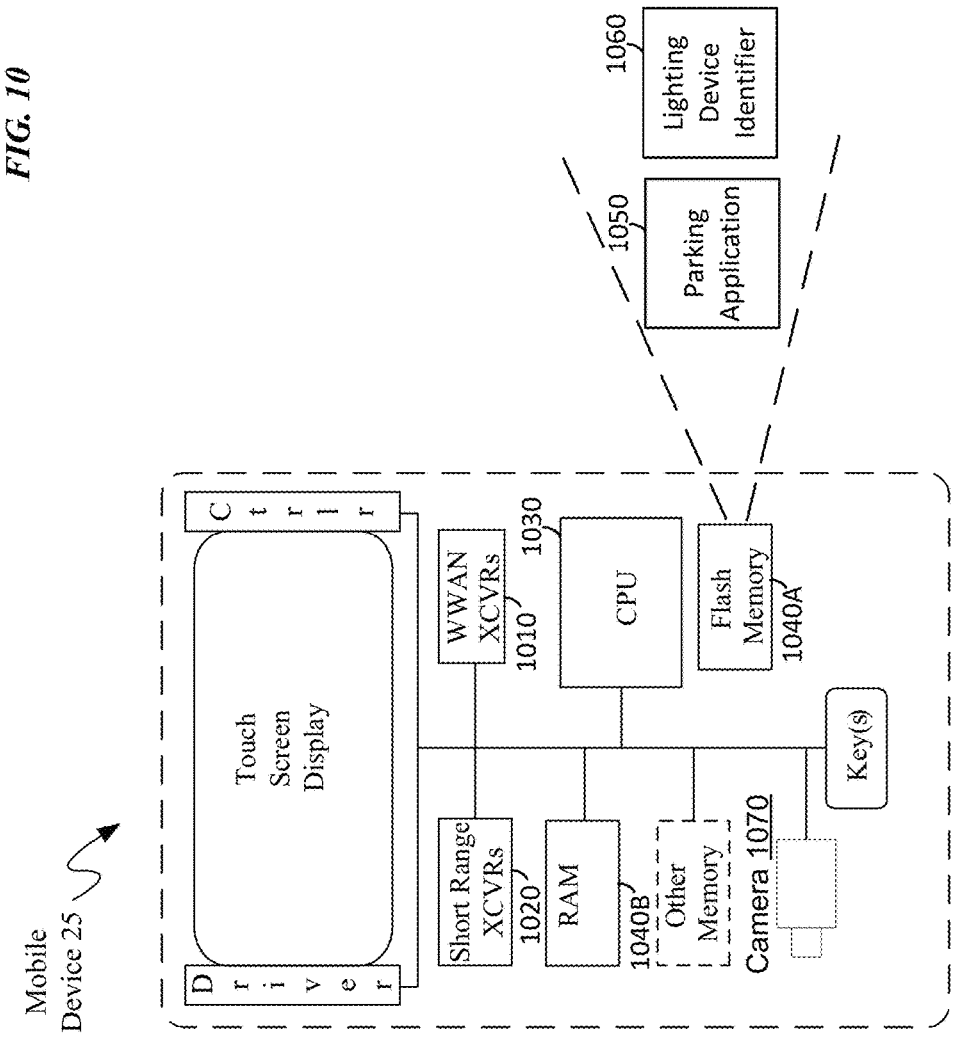
FIG. 10 shows a hardware configuration of a mobile device in FIG. 1, in simplified block diagram form.

FIG. 10 is a high-level functional block diagram of an example of a mobile device 25, such as a smartphone, that communicates via the system 100 of FIG. 1.

Shown are elements of a touch screen type of mobile device 25 having the vehicle parking application 1050 loaded, although other non-touch type mobile devices can be used in the vehicle parking communications and controls under consideration here. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 10 therefore provides a block diagram illustration of the example mobile device 25 having a touch screen display for displaying content and receiving user input as (or as part of) the user interface.

The activities that are the focus of discussions here typically involve data communications related to vehicle parking. As shown in FIG. 10, the mobile device 25 includes at least one digital transceiver (XCVR) 1010, for digital wireless communications via a wide area wireless mobile communication network, although the mobile device 25 also includes additional digital or analog transceivers, such as XCVR 1020 for short-range communication, such as NFC, VLC, DECT, ZigBee, Bluetooth, or WiFi. Mobile device 25 also includes a camera 1070, such as a rolling shutter camera, for VLC.

The transceiver 1010 (network communication interface) conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, transceivers 1010, 1020 provide two-way wireless communication of information including digitized audio signals, still image and/or video signals, web page information for display as well as web related inputs, and various types of mobile message communications to/from the mobile device 25 for vehicle parking control strategies.

Several of these types of communications through the transceivers 1010, 1020 and a network, as discussed previously, relate to protocols and procedures in support of communications with the luminaires 15A-C, parking garage gate system 70, and parking session server 80 for processing vehicle parking sessions and lighting device control protocols for driving the display or general illumination light sources of the luminaire forming the lighting device. Such communications, for example, may utilize IP packet data transport utilizing the digital wireless transceiver (XCVR) via the gateway 60, for example, shown in FIG. 1.

In one example, the transceivers 1010 sends and receives a variety of signaling messages in support of various data services provided by a network of a wireless service provider, to user(s) via a mobile communication network (not shown). Transceiver 1010 connects through radio frequency (RF) send-and-receive amplifiers (not shown) to an antenna (not shown).

Mobile device 25 also supports wireless local area network communications over Wi-Fi, instead of or in addition to data communications using the wide area mobile communication network. Hence, in the example of FIG. 10, for packet data communications, mobile device 25 also includes a Wi-Fi transceiver 1020 and associated antenna (not shown). Although Wi-Fi is used here as the example, the transceiver 1020 may take the form of any available two-way wireless local area network (WLAN) transceiver of a type that is compatible with one or more standard protocols of communication implemented in wireless local area networks, such as one of the Wi-Fi standards under IEEE 802.11 and/or WiMAX.

The transceiver 1020, for example, may provide two-way data transport for wireless communication with a wireless access point, such as a gateway 60 (shown in FIG. 1) in the parking garage. A Wi-Fi access point communicates with compatible user equipment, such as mobile device 25, over the air using the applicable Wi-Fi protocol. The Wi-Fi access point provides network connectivity. The Wi-Fi access point would connect directly or via a local network 50 (shown in FIG. 1) to a line providing internet access service.

The mobile device 25 further includes a microprocessor, shown as CPU 1030, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 1030, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 1030 or processor hardware in smartphone, laptop computer, and tablet.

Returning more specifically to the smartphone example of FIG. 10, the microprocessor 1030 serves as a programmable host controller for the mobile device by configuring the mobile device to perform various operations, for example, in accordance with instructions or programming executable by processor 1030. For example, such operations may include various general operations of the smartphone, as well as operations related to communications with lighting devices 15A-C, parking garage gate system 70, and parking session server 80. Although a processor may be configured by use of hardwired logic, typical processors in mobile devices are general processing circuits configured by execution of programming.

The mobile device 25 includes a memory or storage system, for storing data and programming. In the example, the memory system may include a flash memory 1040A and a random access memory (RAM) 1040B. The RAM 1040B serves as short term storage for instructions and data being handled by the processor 1030, e.g. as a working data processing memory. The flash memory 1040A typically provides longer term storage.

Hence, in the example of mobile device 25, the flash memory 1040A is used to store programming or instructions for execution by the processor 802. Depending on the type of device, the mobile device 25 stores and runs a mobile operating system through which specific applications, including a vehicle parking application 1050 (which may be a web browser executing a dynamic web page), runs on mobile device 25. Examples of mobile operating systems include Google Android, Apple iOS (I-Phone or iPad devices), Windows Mobile, Amazon Fire OS, RIM BlackBerry operating system, or the like. Flash memory 1040A may also be used to store mobile configuration settings for different mobile applications or services executable at mobile device 25 using processor 1030, such as a lighting device identifier 1060 indicating where a user of the mobile device 25 has parked their respective vehicle.

FIG. 11 illustrates distribution over the output area of the luminaire at 1310 of output light from the display and illumination light output from the general illumination light source so as to display the visual direction indicator as described in FIG. 2. The simple example represents an image output of a colored arrow 21 (e.g. a red arrow) surrounded by white area 23 of the image 22. Such an image 22, for example, might provide an arrow 22 for a sign function pointing the direction to a location of interest, e.g. a parking space, an elevator, a building entrance or exit, etc. In this example, the image 22 containing both the arrow 21 and the white area 23, is output across the entire area of the luminaire output 131o. It should be understood that the illumination light source LEDs can be positioned uniformly across the luminaire and co-located with the display, although in the illustration of FIG. 11 the illumination light source LEDs appear as being outside the colored arrow on the display.

In the example of FIG. 11, all of the first matrix for generating the image output light from the display is operated so as to output light of the image 22 across the entire area of luminaire output 131o. Each emitter of the entire matrix of the display generates a pixel of light of the image. Alternatively, some display light emitters near active illumination light emitting LEDs 25 may be turned OFF or operating in a manner to contribute to general illumination rather than output specific light of the image.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

Program aspects of the technology may be thought of as "products" or "articles of manufacture" typically in the form of executable code and/or associated data that is carried on or embodied in a type of machine readable medium. For example, programming code could include code for the server or the sending device for generating meta-data files and programming for the receiving device for reproducing content based on the meta-data files. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platforms of the media gateway and client device. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

In general, the term "application," as used herein, refers to logic embodied in hardware or software instructions, which can be written in a programming language, such as Java™, C, C++, C#, for example. A software application can be compiled into executable programs or written in interpreted programming languages, such as Perl, Visual Basic script, HTML, or JavaScript. Software applications may be callable from other applications. Generally, applications described herein refer to logical modules that may be merged with other modules or divided into sub-module despite their physical organization. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. For example, unless expressly stated otherwise, a parameter value or the like may vary by as much as ±10% from the stated amount.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A lighting system comprising a plurality of lighting devices, each lighting device comprising:
   an occupancy sensor;
   a communication interface system;
   a display comprising a first light emission matrix configured to output light from selected areas of the first emission matrix as a representation of an image;
   a controllable general illumination light source comprising a second light emission matrix configured to output illumination light from the second light emission matrix, wherein:
   the general illumination light source is co-located with the display such that an available output region of the second light emission matrix at least substantially overlaps an available output region of the first light emission matrix;
   a driver system coupled to control light outputs generated by the first and second light emission matrices;
   a memory storing programming; and
   a processor coupled to the occupancy sensor, the communication interface system, the driver system, and the memory, wherein the processor is configured to operate the general illumination light source and the display via the driver system and implement functions in the stored programming, including functions to:
- detect via the occupancy sensor that a respective parking space is vacant;
- in response to detecting via the occupancy sensor that the respective parking space is vacant, display a first visual indicator on the display to produce visible output via the display to provide a first visible cue indicating that the respective parking space is vacant;
- operate the controllable general illumination light source to adjust a lighting state of the output illumination light;
- detect via the occupancy sensor that a vehicle has parked in the respective parking space; and
- in response to detecting that the vehicle has parked in the respective parking space, display a second visual indicator on the display to produce visible output via the display to provide a second visible cue indicating that the respective parking space is occupied.

2. The lighting system of claim 1, wherein the first and second visual indicators produced as the visible output via the display include a color change, blinking in a pattern, flashing, or light intensity change to provide the first or second visible cues indicating that the respective parking space is vacant or occupied, respectively.

3. The lighting system of claim 1, wherein the plurality of lighting devices include first and second lighting devices positioned in different locations of the parking garage, the first lighting device is located proximate a first parking space that is occupied by the vehicle and the second lighting device is located proximate a second parking space that is distant from the first parking space.

4. The lighting system of claim 3, wherein the processor of the second lighting device is further configured to:
- after a predetermined time period, detect that a user of a mobile device has reentered the parking garage by communicating via the communication interface system with the mobile device of the user; and
- in response to detecting that the user has reentered the parking garage:
  - operate the controllable general illumination light source to adjust the lighting state by increasing the light intensity of the output illumination light; and
  - operate the display to provide a visual directional indicator to instruct the user of a direction of the first parking space occupied by the vehicle relative to the second lighting device.

5. The lighting system of claim 4, wherein the visual direction indicator produces visible output to the user via the display and the visible output is a relative direction or directional arrow shape to guide the user to the first parking space and instruct the user of the direction of the first parking space relative to the second parking space.

6. The lighting system of claim 5, wherein the visual direction indicator is the relative direction on a Cartesian coordinate system including left, right, forward, backward, up a level of the parking garage, or down a level of the parking garage.

7. The lighting system of claim 4, wherein:
the plurality of lighting devices includes a third lighting device and the third lighting device is located in the parking garage proximate a third parking space that is positioned in between the first and second parking spaces in the parking garage;
the processor of the second lighting device is configured to transmit a command to the third lighting device via the communication interface system to indicate that the user of the mobile device has reentered the parking garage; and
the processor of the third lighting device is configured to:
- in response to receiving the command that the user has reentered the parking garage from the second lighting device:
  - operate the controllable general illumination light source of the third lighting device to adjust the lighting state by increasing the light intensity of the output illumination light; and
  - operate the display of the third lighting device to provide a visual directional indicator to instruct the user of a direction of the first parking space occupied by the vehicle relative to the third lighting device.

8. The lighting system of claim 7, wherein:
the plurality of lighting devices further comprise a camera for visible light communication (VLC);
the communication interface system includes a modulator coupled to the display or the controllable general illumination light source;
the processor is coupled to the camera and the modulator, and the processor is further configured to control the modulator to modulate intensity of visible light emitted by the display or the controllable general illumination light source for VLC; and
wherein the processor of the second lighting device is configured to communicate a command indicating that the user of the mobile device has reentered the parking garage by VLC to the third lighting device.

9. The lighting system of claim 3, wherein:
the plurality of lighting devices further comprise a camera for visible light communication (VLC);
the communication interface system includes a modulator coupled to the display or the controllable general illumination light source; and
the processor is coupled to the camera and the modulator, and the processor is further configured to control the modulator to modulate intensity of visible light emitted by the display or the controllable general illumination light source for VLC.

10. The lighting system of claim 9, wherein:
the memory of the first lighting device stores a map of the parking garage with locations of the plurality of lighting devices on different levels of the parking garage and a respective visible light communication (VLC) identifier of each of the plurality of the lighting devices;
the processor of the first lighting device sends via VLC with the mobile device the respective VLC identifier of the first lighting device in response to logging a time of entry of the vehicle into the first parking space;
in response to receiving the first lighting device VLC identifier, the mobile device stores the first lighting device VLC identifier; and
the processor of each of the plurality of lighting devices is configured to:
- detect that a user of a mobile device has reentered the parking garage by communicating via the communication interface system with the mobile device of the user; and
- receive via the communication interface system the first lighting device VLC identifier from the mobile device;
- in response to receiving the first lighting device VLC identifier, calculate a relative direction of the first parking space relative to the respective lighting device by comparing the first lighting device VLC identifier against a VLC identifier of the respective lighting device on the map;

based on the calculated relative direction of the first parking space, generate a visual directional indicator to instruct the user of the relative direction; and operate the display to produce the visual directional indicator as visible output to instruct the user of the relative direction of the first parking space occupied by the vehicle from the respective lighting device.

11. The lighting system of claim 3, wherein:

the second parking space proximate the second lighting device is closer to an entrance of the parking garage than the first parking space proximate the first lighting device; and the memory of the second lighting device stores a map of the parking garage with locations of the plurality of lighting devices on different levels of the parking garage and a respective occupancy status of the respective parking space of each of the plurality of lighting devices; and the processor of the second lighting device is further configured to:

detect entry of a user of a mobile device that is being carried by the vehicle in the parking garage by communicating with the mobile device via the wireless communication interface system;

in response to detecting entry of the vehicle in the parking garage, guide the user to the first parking space by:

checking against the map to determine a nearest vacant parking space to the vehicle, wherein the first parking space of the first lighting device is determined to be the nearest parking space;

in response to determining the nearest vacant parking space to the vehicle, calculate a relative direction of the first parking space relative to the second lighting device;

based on the calculated relative direction of the first parking space, generate a visual directional indicator to instruct the user of the relative direction; and operate the display to produce the visual directional indicator as visible output to instruct the user of the relative direction of the first parking space from the second lighting device.

12. The lighting system of claim 3, wherein the processor of the first lighting device is further configured to:

in response to detecting that the vehicle has parked in the first parking space, activate a first parking session by communicating via the communication interface system with a mobile device of a user and a parking session server;

receive a parking session expiration notification via the communication interface system from the parking session server indicating that a respective parking session of the vehicle has expired; and in response to receiving the parking session expiration notification via the communication interface system from the parking session server that the respective parking session of the vehicle has expired, detect that the vehicle is still parked in the respective parking space via the occupancy sensor.

13. The lighting system of claim 12, wherein the processor of the first lighting device is further configured to in response to receiving the parking session expiration notification and detecting that the vehicle is still parked in the respective parking space via the occupancy sensor, operate the display to provide a third visible cue indicating that the parking session is expired.

14. The lighting system of claim 12, wherein the parking session server comprises:

a network communication interface system configured for data communication over a network with the plurality of lighting devices or the mobile device;

a processor coupled to the network communication interface system;

a memory accessible to the processor and storing a set of parking sessions that includes the first parking session of the vehicle occupying the first parking space, wherein each of the set of parking sessions include: (i) a parking session identifier, (ii) a time of entry into a respective parking space, (iii) a user selected amount of time to occupy the respective parking space, (iv) a respective lighting device identifier, and (v) identification of a user of a respective mobile device or a vehicle occupying the respective parking space;

programming in the memory which configures the parking session server to perform functions, including functions to:

communicate with the mobile device directly or indirectly via the first lighting device to initiate the first parking session by generating (i) a first parking session identifier and receiving parking session parameters, including (ii) a time of entry in the first parking space, (iii) a user selected amount of time to occupy the first parking space, (iv) an identifier of the first lighting device, and (iv) identification of the user of the mobile device or the vehicle occupying the first parking space;

in response to communicating with the mobile device to receive the parking session parameters, store the received parking session parameters with the first parking session identifier as the first parking session;

determine that the first parking session has expired by:

adding the time of entry into the first parking space and the user selected amount of time to occupy the first parking space to calculate an expiration time;

comparing the calculated expiration time with a current time; and determining that the calculated expiration time has elapsed relative to the current time;

in response to determining that the first parking session has expired, send the parking session expiration notification via the communication interface system to the first lighting device indicating that the first parking session has expired.

15. The lighting system of claim 14, wherein:

the plurality of lighting devices further comprise a camera;

the second lighting device is positioned behind a license plate of the vehicle parked in the first parking space;

wherein the processor of the first lighting device is further configured to:

in response to receiving the parking session expiration notification and detecting that the vehicle is still parked in the respective parking space via the occupancy sensor, transmit a command via the communication interface system to the second lighting device via the communication interface system requesting that the second lighting device operate the respective camera to photograph the license plate of the vehicle occupying the first parking space;

wherein the processor of the second lighting device is further configured to:

in response to receiving the command via the communication interface system to photograph the license plate of the vehicle occupying the first parking space from the first lighting device, operate the respective camera of the second lighting device to photograph the license plate of the vehicle occupying the first parking space.

16. The lighting system of claim 15, wherein:

the processor of the second lighting device is further configured to:
  store the photograph of the license plate of the vehicle occupying the first parking space in the respective memory;
  send the photograph via the communication interface system to the first lighting device;
the processor of the first lighting device is further configured to:
  in response to receiving the photograph of the license plate of the vehicle occupying the first parking space, store the photograph in the respective memory;
  transmit the photograph and an identifier of the first lighting device via the communication interface system to the parking session server.

17. The lighting system of claim 3, further comprising:
a parking session server including:
  a network communication interface system configured for data communication over a network with the plurality of lighting devices;
  a processor coupled to the network communication interface system;
  a memory accessible to the processor storing programming and further storing: (i) a set of parking sessions of vehicles having an associated parking session identifier, a lighting device identifier, and a state of pending, complete, or expired, wherein the set of parking sessions includes a first parking session of the vehicle occupying the first parking space, (ii) a set of photographs of vehicles determined to have parked in a respective parking space after expiration of a parking session, and (iii) a map of the parking garage with respective locations and identifiers of the plurality of lighting devices on different levels of the parking garage and a respective occupancy status of the respective parking space of each of the plurality of lighting devices;
wherein the processor of the first lighting device is further configured to:
  after logging a time of entry of the vehicle in the first parking space in the respective memory, send the time of entry of the vehicle and an identifier of the first lighting device to the parking session server;
  after a time period, detect via the occupancy sensor that the vehicle has exited the first parking space;
  in response to detecting that the vehicle has exited the first parking space, log termination of the parking session and a time of exit in the respective memory; and
  send the time of exit and the identifier of the first lighting device to the parking session server; and
wherein the programming implemented by the processor of the parking session server configures the parking session server to perform functions, including functions to:
  in response to receiving the time of entry of the vehicle, generate a first parking session with a first parking session identifier and the state as pending and store the first parking session identifier, the first lighting device identifier, and the time of entry as a pending parking session in the memory; and
  in response to receiving the time of exit of the vehicle, store the time of exit in the memory and change the state of the first parking session to complete.

18. The lighting system of claim 17, wherein:
the memory of the second lighting device stores a map of the parking garage with locations of the plurality of lighting devices on different levels of the parking garage and exits of the parking garage; and
after the parking session server changes the state of the first parking session to complete, the processor of the second lighting device is further configured to:
  detect that a user of a mobile device that is being carried by the vehicle in the parking garage is passing by the second lighting device by communicating with the mobile device via the wireless communication interface system;
  in response to detecting the vehicle is passing by the second lighting device, guide the user to the exit by:
    checking against the map of exits to determine a nearest exit of the parking garage;
    in response to determining the nearest exit, calculate a relative direction of the nearest exit relative to the second lighting device;
    based on the calculated relative direction of the nearest exit, generate a visual directional indicator to instruct the user of the relative direction; and
    operate the display to produce the visual directional indicator as visible output to instruct the user of the relative direction of the nearest exit from the second lighting device.

19. The lighting system of claim 18, further comprising:
a networked parking garage gate system located at the nearest exit and including:
  an electrically-controlled gate arm;
  a network communication interface system configured for data communication over a network with the parking session server, the mobile device, and the plurality of lighting devices;
  a processor coupled to the network communication interface system and the electrically-controlled gate arm;
  a memory accessible to the processor and storing programming and a list of parking session identifiers of the completed parking sessions including the first parking session;
  wherein the programming implemented by the processor of the networked parking garage gate system configures the networked parking garage gate system to perform functions, including functions to:
    communicate with the parking session server via the network communication interface system to receive the completed parking session identifiers;
    communicate with the mobile device or the second lighting device to receive the first parking session identifier of the first parking session;
    determine whether to open the electrically-controlled gate arm by comparing the received first parking session identifier against the list of completed parking session identifiers;
    upon determining that the first parking session identifier is on the list of completed session identifiers, open the electrically-controlled gate arm; and in response to opening the electrically-controlled gate arm, remove the first parking session identifier from the list of completed parking session identifiers; and transmit a session termination command to the parking session server indicating that the vehicle associated with the first parking session has exited the parking garage;

wherein in response to receiving the session termination command from the networked parking garage gate system, the processor of the parking session server is further configured to remove the first parking session from the set of parking sessions.

20. The lighting system of claim 1, wherein the communication interface system of the plurality of lighting devices includes:

a wireless radio frequency (RF) communication interface for WiFi, Bluetooth, ZigBee, wireless mesh, or cellular data for communication between the plurality of lighting devices, a parking session server, or a networked parking garage gate system; and a second optical wireless communication interface for visible light communication (VLC) for data communication with the plurality of lighting devices or the mobile device.

* * * * *